United States Patent
Sihra et al.

(10) Patent No.: US 11,692,556 B2
(45) Date of Patent: **\*Jul. 4, 2023**

(54) CONTAINMENT OR SEPARATION SEAL

(71) Applicant: JOHN CRANE UK LIMITED, Slough (GB)

(72) Inventors: Inderpal Singh Sihra, Windsor (GB); Isaac Lopez Higuera, London (GB); Aidan James Nicholls, Reading (GB)

(73) Assignee: JOHN CRANE UK LIMITED, Slough (GB)

( \* ) Notice: Subject to any disclaimer, the term of this patent is extended or adjusted under 35 U.S.C. 154(b) by 0 days.

This patent is subject to a terminal disclaimer.

(21) Appl. No.: 17/840,821

(22) Filed: Jun. 15, 2022

(65) Prior Publication Data

US 2022/0307514 A1 Sep. 29, 2022

Related U.S. Application Data

(63) Continuation of application No. 17/152,997, filed on Jan. 20, 2021, now Pat. No. 11,506,217.

(60) Provisional application No. 63/104,897, filed on Oct. 23, 2020, provisional application No. 62/963,702, filed on Jan. 21, 2020.

(51) Int. Cl.
*F04D 29/12* (2006.01)
*F16J 15/34* (2006.01)

(52) U.S. Cl.
CPC ........ *F04D 29/124* (2013.01); *F16J 15/3404* (2013.01)

(58) Field of Classification Search
None
See application file for complete search history.

(56) References Cited

U.S. PATENT DOCUMENTS

| | | | |
|---|---|---|---|
| 5,909,879 | A | 6/1999 | Simpson |
| 5,989,511 | A | 11/1999 | Gruen et al. |
| 6,325,378 | B1 | 12/2001 | Okumachi et al. |
| 6,386,547 | B2 | 5/2002 | Wu et al. |
| 6,505,836 | B1 | 1/2003 | Toshihiko |
| 7,726,659 | B2 | 6/2010 | Fujiwara et al. |
| 7,744,094 | B2 | 6/2010 | Yanagisawa et al. |
| 7,823,885 | B2 | 11/2010 | Dröscher et al. |
| 7,862,046 | B2 | 1/2011 | Lederer et al. |
| 7,883,093 | B2 | 2/2011 | Ueda et al. |
| 8,061,984 | B2 | 11/2011 | Kuzdzal et al. |

(Continued)

FOREIGN PATENT DOCUMENTS

| | | |
|---|---|---|
| DE | 3819566 A1 | 12/1989 |
| DE | 10017669 A1 | 10/2001 |

(Continued)

OTHER PUBLICATIONS

Chesterton Global Solutions, "4400 Dual Concentric Gas Seal" Brochure, Sep. 2015, 8 pages.

(Continued)

*Primary Examiner* — Michael L Sehn
(74) *Attorney, Agent, or Firm* — Cantor Colburn LLP

(57) ABSTRACT

A seal includes a mating ring that rotates relative to a carbon primary ring at a seal interface. A buffer gas is provided into the seal and passes from the back of the primary ring to the seal interface. The seal can be used as a separation seal or in combination with another seal.

19 Claims, 16 Drawing Sheets

(56) References Cited

U.S. PATENT DOCUMENTS

| | | |
|---|---|---|
| 8,753,014 B2 | 6/2014 | Devitt |
| 9,441,668 B2 | 9/2016 | Devitt |
| 9,488,187 B2 | 11/2016 | Bardon et al. |
| 9,556,960 B2 | 1/2017 | Thelke et al. |
| 9,624,785 B2 * | 4/2017 | Doumecq-Lacoste ............... F01D 21/003 |
| 9,841,107 B2 | 12/2017 | Otschik et al. |
| 10,030,666 B2 | 7/2018 | Devitt |
| 10,100,932 B2 | 10/2018 | Devitt |
| 10,495,228 B2 | 12/2019 | Itadani et al. |
| 2005/0042161 A1 | 2/2005 | Carlisle et al. |
| 2008/0128994 A1 | 6/2008 | Simon et al. |
| 2014/0142007 A1 | 5/2014 | Lim et al. |
| 2014/0286599 A1 | 9/2014 | Devitt et al. |
| 2018/0128378 A1 | 5/2018 | Tokunaga et al. |
| 2019/0049019 A1 | 2/2019 | Devitt |
| 2021/0048035 A1 | 2/2021 | Elcock et al. |
| 2021/0207715 A1 | 7/2021 | Werdecker et al. |
| 2021/0222701 A1 * | 7/2021 | Sihra ............... F04D 29/124 |

FOREIGN PATENT DOCUMENTS

| | | |
|---|---|---|
| EP | 2029919 A1 | 3/2009 |
| EP | 2735777 A1 | 5/2014 |
| EP | 2923095 B1 | 3/2019 |
| GB | 1378259 | 12/1974 |
| JP | 62037572 | 2/1987 |
| JP | 10292867 | 11/1998 |
| JP | 2006077899 | 3/2006 |
| WO | 2007147508 A1 | 12/2007 |

OTHER PUBLICATIONS

Notice of Allowance for U.S. Appl. No. 17/152,997, dated Mar. 29, 2022, 14 pages.

Notification of Transmittal of the International Search Report and the Written Opinion of the International Searching Authority, or the Declaration; PCT/IB2021/050465; dated Jul. 1, 2021, 21 pages.

Shifeng Wu et al., "Development of a Twin Hybrid NonContacting Gas Seal and Its Application to Process Pumps", Proceedings of the 16th International Pump Users Symposium, Mar. 2-4, 1999, 9 pages.

* cited by examiner

CONTAINMENT OR SEPARATION SEAL

DOMESTIC PRIORITY

This application is a continuation of U.S. patent application Ser. No. 17/152,997, filed Jan. 20, 2021 which claims the benefit of an earlier filing date from U.S. Provisional Application Ser. No. 62/963,702 filed Jan. 21, 2020 and U.S. Provisional Application Ser. No. 63/104,897 filed Oct. 23, 2020, the entire disclosures of which are incorporated herein by reference.

BACKGROUND

Exemplary embodiments pertain to the art of seals and, in particular to a non-contact seal.

Dry gas seals are typically used to seal centrifugal compressors that are often used in transportation and distribution of gasses such as natural gas. For instance, in a natural gas pipeline, compressors may be located at set intervals to boost the gas pressure for processing, to counter the effect of flow losses along the transmission pipelines, and to generally keep the gas moving towards its destination.

In general, dry gas seals operate by providing a seal between a rotating ring and a stationary ring. The rotating ring is sometimes referred to as a "mating ring" as it is mated to the rotating shaft/rotor. The rotating ring can be mated to the rotor via a shaft sleeve. The stationary ring can sometimes be referred to as the primary ring and does not rotate during operation. In operation, a layer of gas is developed between the two rings that forms a seal while allowing the rings to move relative to one another without contacting each other. The gas layer is formed from process or sealing gas injected into the dry gas seal.

When installed into a compressor, such dry gas seals may be located next to or near a bearing or bearing cavity of the compressor or other machinery. These bearings can be lubricated by and operate with, for example, oil or another liquid lubricant.

A separation seal can serve to prevent or reduce oil or other lubricants of the bearing from entering the dry gas seal. In the typical separation seal, a separation gas is injected between two bushings to create a pressure barrier between the bearing and the dry gas seal. In more detail, a typical separation seal includes an inlet into which the separation or buffer gas is provided. The separation gas escapes axially outward in both the in-board and outboard directions. The gas is provided between two bushings that can either contact the shaft (or a sleeve placed thereon) in a contact separation seal or be slightly separated from the shaft in a non-contacting separation seal.

SUMMARY

Disclosed is a separation seal for preventing fluid from entering a dry gas seal surrounding a shaft of a rotating machine. The separation seal includes a stator configured to be mounted around the shaft and configured to be fixedly attached to the rotating machine, the stator including primary ring control chamber formed therein, a primary ring having a back, and a first thrust ring at least partially within the primary ring control chamber and coupled to the primary ring. The seal also includes a mating ring coupled to the shaft that rotates with the shaft and relative to the porous primary ring and one or more biasing members that urges the porous primary ring toward the mating ring to form a seal interface between porous primary ring and the mating ring.

In this seal, the wherein the stator includes a passageway constructed and arranged to convey pressurized buffer gas to the primary ring control chamber such that gas passes from the back of the primary ring, through the primary ring and to the seal interface and buffer gas that reaches the seal interface passes, in normal operation, both radially inward and radially outward along the seal interface. The mating ring includes grooves formed on a face thereof. In the event of a buffer gas delivery reduction the grooves pumps gas from an inner diameter of the seal interface to an outer diameter of the seal interface.

In any embodiment disclosed herein, the primary ring can optionally be formed of porous carbon.

In any embodiment disclosed herein, the seal can includes one or more sealing elements disposed between the first thrust ring and the back of the porous primary ring and within the primary ring control chamber. The sealing elements are spaced apart from the back of the porous carbon seal by a separating member In one embodiment, the sealing elements are spaced apart from the back of the porous carbon seal by a separating member. In one embodiment, the separating member is a ring and in another it is a second thrust ring.

Also disclosed is an assembly for sealing a fluid in a rotating machine that includes a primary dry gas seal adapted and configured to surround a shaft of the rotating machine and prevent the fluid from exiting the rotating machine; and a secondary seal connected to the primary dry gas seal adapted and configured to prevent a liquid from entering the dry gas seal.

The secondary seal can any seal mentioned or otherwise disclosed herein.

In one embodiment, the secondary seal of the assembly includes a stator configured to be mounted around the shaft and configured to be fixedly attached to the rotating machine, the stator including a primary ring control chamber formed therein; a porous primary ring formed of a porous material and having a back; and a split thrust ring at least partially within the primary ring control chamber and coupled to the porous primary ring, the split thrust ring including an inner ring and outer ring, wherein the inner ring is configured to move axially inboard relative to the outer ring in the event of an increase in the flow of the fluid through the primary dry gas seal. The secondary seal can also include a mating ring coupled to the shaft that rotates with the shaft and relative to the porous primary ring; an outer ring biasing members that urges the outer ring and the porous primary ring toward the mating ring to form a seal interface between porous primary ring and the mating ring; an inner ring biasing members that urges the inner ring and the porous primary ring toward the mating ring; and one or more sealing elements disposed between the split thrust ring and the back of the porous primary ring and within the primary ring control chamber. In this embodiment, the stator includes a passageway constructed and arranged to convey pressurized buffer gas to the primary ring control chamber such that gas passes from the back of the porous primary ring, through the porous primary ring and to the seal interface.

In one embodiment, in the assembly, buffer gas that reaches the seal interface passes, in normal operation, both radially inward and radially outward along the seal interface.

In one embodiment, in the assembly, a vent is provided that receives gas that passes through the primary dry gas seal and the buffer gat that travels radially inward along the seal interface.

In one embodiment, in the assembly, the stator defines a dry gas seal side passage way that allows buffer gas that passes radially inward to reach the vent during normal operation.

In one embodiment, in the assembly, the fluid is process gas and, in the event that the flow process gas through primary gas seal increases pressure in the vent above a threshold, the process gas that passes through the primary gas seal travels along the dry gas seal side passage to an inner diameter of the seal interface.

In one embodiment, in the assembly, the process gas at the inner diameter causes the inner ring to move axially with respect to the outer ring when the gas in the vent exceeds the threshold.

In one embodiment, in the assembly, axial movement of the inner ring allows the process gas to enter the primary ring control chamber.

In one embodiment, in the assembly, the mating ring includes grooves formed on a face therein, wherein the grooves pumps process gas from the inner diameter of the seal interface to an outer diameter of the seal interface.

In one embodiment, in the assembly, the porous primary ring is formed of porous carbon.

In one embodiment, in the assembly, the sealing elements are spaced apart from the back of the porous carbon seal by a separating member that can be, for example, a ring.

In any embodiment of the seal or assembly herein, the back of the primary ring can include one or more grooves to receive a sealing element.

In any embodiment of the seal or assembly herein, the front surface of either of the inner and outer thrust ring can be flat or can include grooves to receive a sealing element.

In any embodiment of the seal or assembly herein, the sealing members can be o-rings with different cross-sectional diameters

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
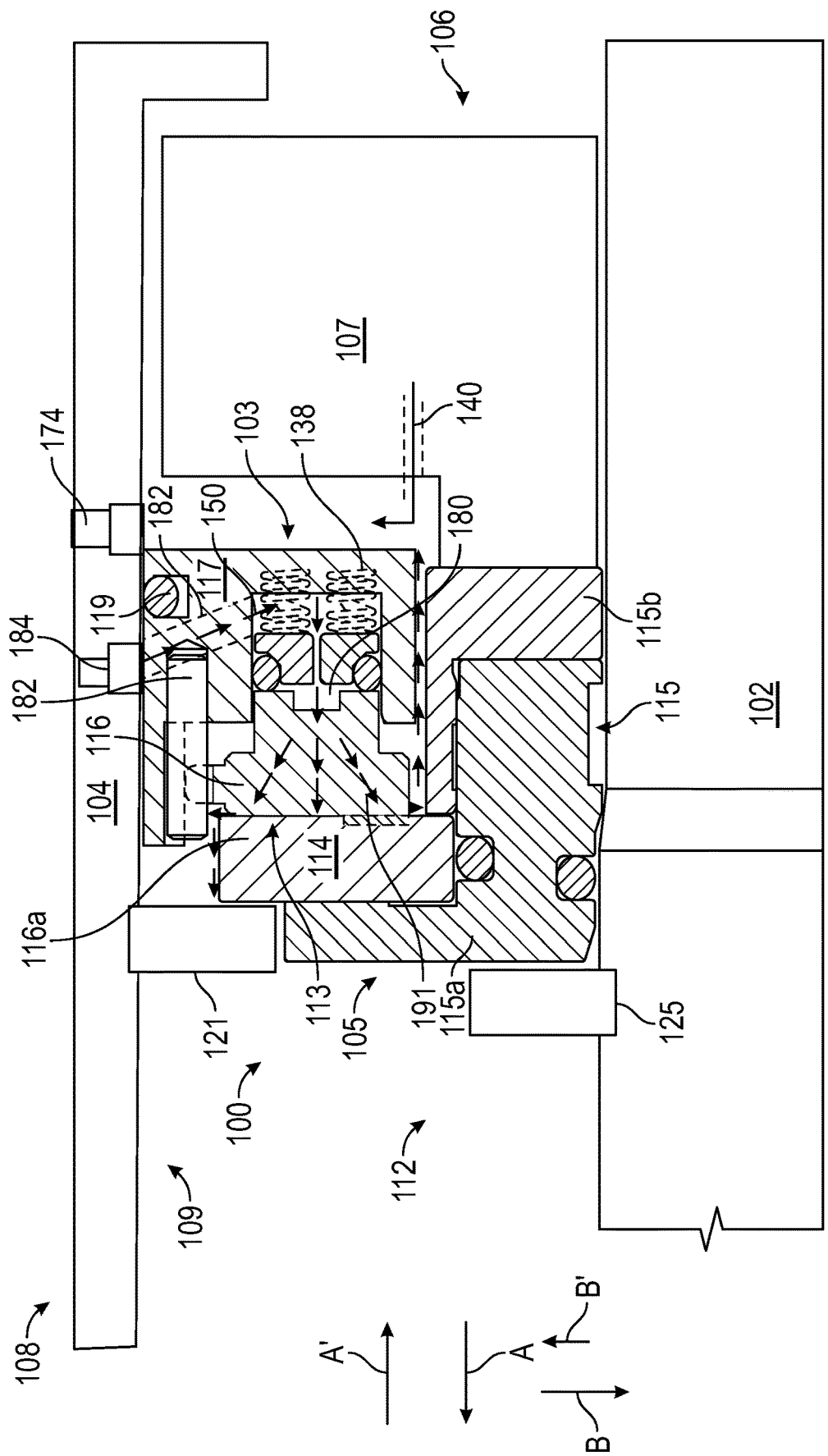
FIG. 1 is a partial-cross section of a separation seal according to one embodiment that is disposed adjacent to a generic dry gas seal.

The diagrams depicted herein are illustrative. There can be many variations to the diagram or the operations described therein without departing from the spirit of the invention. For instance, the actions can be performed in a differing order or actions can be added, deleted or modified. Also, the terms "connected," "coupled" and the like and variations thereof describes having a communications path between two elements and does not imply a direct connection between the elements with no intervening elements/connections between them. All of these variations are considered a part of the specification.

DETAILED DESCRIPTION

A detailed description of one or more embodiments of the disclosed apparatus and method are presented herein by way of exemplification and not limitation with reference to the Figures.

Disclosed herein is a seal that includes a porous carbon primary ring. The seal can be a standalone seal that operates, for example, as a separation seal. Alternatively, the seal can be operated as a containment or back-up seal to a primary dry gas seal. In both cases, the carbon primary ring is either directly or indirectly coupled to a thrust ring. In normal operation, a buffer or separation gas is provided to the seal, the gas passes through the thrust ring and through the porous carbon primary ring, and the gas creates a thin film between the faces of the carbon primary ring and a rotating mating ring. To address situations where the gas flow may be reduced (e.g., below a threshold that will independently keep the rings from contacting each or that can support the thin film), the mating ring may have grooves formed thereon that pump gas between the faces to prevent them from contacting. In the separation seal usage case, the thrust ring can be a single or a split thrust ring.

In cases where the seal is used as a containment seal, in normal operation the seal operates generally as above. This allows for long running, non-contacting back-up seal. The mating ring may have (but does not have to have) the above described grooves.

In such a case, while both single and split thrust rings may be utilized, in one embodiment, the thrust ring is a split thrust ring that includes two portions that are typically mated but can be separated. If the primary dry gas seal has in increase in gas passing between the rings (e.g., above a pressure that can typically vented out through, for example a choke in the vent), the pressure of the gas escaping from the primary seal will cause the portions of the thrust ring to separate (e.g., the lower/inner thrust ring described below moves away from the porous carbon primary ring). The upper/outer thrust ring takes over and creates a new balance diameter. The grooves on the mating ring will take over and draws high pressure gas from the dry gas seal side and pump it through the sealing interface (e.g., between the face of the primary and mating rings) to create a level of flow towards the bearing side. The result is the maintenance of a positive restriction to prevent or reduce leakage of pressurised gas. While describe as a "back-up" seal, it shall be understood that such a seal may serve a dual purpose as a back-up seal and a separation seal. This can allow for a single seal unit to be provided that does not need an additional separation seal.

FIG. 1 is a cross section of a seal 100 according to one embodiment. This embodiment shows the seal 100 as a separation seal but the teachings related to can also be applied to a back-up seal or containment seal of dry gas seal assembly. For simplicity, the discussion of FIG. 1 will refer to the seal 100 simply as a seal but it can be used in either context. In addition, FIG. 1 will be used to describe the general operation of the seal.

In one use, the seal 100 is intended to be located between a dry gas seal 107 and a bearing cavity 108. Herein, the seal 100 shall be referred to as having an inboard (or seal) side 103 and an outboard (or bearing) side 105. The inboard side 103 is typically disposed proximate a dry gas seal 107 and the outboard side 105 is typically disposed proximate a bearing or bearing cavity 108 containing a bearing. This is, however, not a required orientation of elements. As will be understood, the seal 100 and the dry gas seal 107 can be included as part of a cartridge that can include one or more separation and dry gas seal elements. Examples of dry gas seals can be found in the prior art and the dry gas seal 107 can be any type of dry gas seal. The same is true of the bearings in the bearing housing.

Both the seal 100 and the dry gas seal 107 are arranged and designed to be attached to shaft 102. Herein, the term shaft will generally be used to refer to a shaft of a turbo-compressor. The teachings herein can be applied, however, to any rotating machine and the shaft may or may not include a sleeve thereon. In the case where a sleeve is provided, the term "shaft" shall include the combination of the shaft and the sleeve.

From time to time certain directions will be used herein. An outboard direction is the direction extending in the direction of arrow A and the inboard direction (e.g., towards the dry gas seal 107 or the process chamber 106 described below) is in the opposite direction as indicated by arrow A'. The radially inward direction is in the direction of arrow B which is directed toward a center of the shaft 102 and the radially outward direction is in the opposite direction as indicated by arrow B'.

At least a portion of the seal 100 is positioned between a rotating compressor shaft 102 and a compressor housing 104. The seal 100 is also positioned between the bearing cavity 108 and the gas seal 107 to keep bearing oil from impinging in the gas seal 107.

The rotating compressor shaft 102 is generally part of a compressor and is operably coupled to a compressor impeller (not shown) disposed in a process cavity 106 of the compressor, and is supported by the housing 104 via a bearing (not shown) disposed in a bearing cavity 108 of the housing 104. The rotating compressor shaft 102 is the rotor of the compressor in most instances and may be referred to simply as a rotating shaft from time to time herein. It shall be understood that the rotating shaft need not be the rotor of the compressor itself but could be any shaft connected to the rotor that rotates with it around which a seal should be provided.

The compressor housing 104 includes a bore 109 formed in it that extends between a process cavity 106 and a bearing cavity 108 and defines an annular seal chamber 112 into which the seal 100 and the dry gas seal 107 may be inserted. The process cavity 106 includes the gas (typically a hydrocarbon) being compressed by the compressor. That gas is referred to as process gas herein.

The seal 100 includes a stator 117 that can be formed of one or more components and joined in a fixed relationship to one another as well as with the compressor housing 104 when installed. As shown, the stator 117 is formed as a retainer ring that can be sealed to the compressor housing 104 by any sealing element such as a radial seal 119.

The seal 100 can also include a sleeve ring 115 that can be formed of one or more components and that is attached to the rotating shaft 102 such that it rotates with the rotating shaft 102. The illustrated separation seal sleeve ring 115 includes two portions 115a, 115b in FIG. 1. In particular, the separation seal sleeve ring 115 includes a rotating ring 115a that is configured to contact and rotate with the rotating shaft 102. In the illustrated embodiment, a spacer or locking sleeve 115b is included as part of the sleeve ring 115. Of course, the sleeve ring 115 could be formed as a unitary piece or could include any number of pieces that are either joined together or otherwise held stationary relative to each other during operation (e.g., all pieces rotate together as one).

Assuming that the process gas in the process cavity 106 is under pressure, all components of the seal 100 and the dry gas seal 107 are urged in the outboard direction A toward thrust/retaining rings 121/125 during operation. Axial movement of the sleeve ring 115 relative to the rotating shaft 102 is limited by a shaft thrust ring 125 received in a groove in the rotating shaft 102. Axial movement of the stator 117 is limited by stator thrust ring 121 received in a groove in the housing 104.

In the above example, it should be understood that the shaft thrust ring 125 can be fixed relative to the sleeve ring 115 so that the two elements rotate together. Also, for sake of completeness, it shall be understood that other elements can be attached to the sleeve ring 115 to provide support or other functions but are not specifically described herein.

The sleeve ring 115 carries and otherwise mates rotating or mating ring 114 to the rotating shaft 102. That is, the sleeve ring 115 being mated to the rotating shaft 102 allows the mating ring 114 to also rotate with the shaft 102. The mating ring 114 can include one or more grooves 191 formed on a face thereof.

During operation, gas 140 in the process cavity 106 that passes through the seal interface formed by mating/primary rings in the dry gas seal can exit a vent 174 in the compressor housing 104.

The seal 100 impedes oil from the bearing cavity 108 from reaching the gas seal 107 in a manner that is similar to how a dry gas seal works. In particular, as with a typical separation seal, the seal 100 keeps the oil from traveling inboard due to the interaction of the mating ring 114 and a primary ring 116. The primary ring 116 can also be referred as stationary ring as it does not rotate with the shaft and is thus, generally or completely, rotationally stationary relative to the housing 104 during operation. Reference numeral 113 identifies the location of the seal interface formed between the mating ring 114 and the primary ring 116.

As will be understood by the skilled artisan, the primary ring 116 is axially movable relative to the housing 104 during operation such that a controlled distance may be maintained between the mating ring 114 and the primary ring 116 at the rotating seal interface 113. In the illustrated embodiment, a force is applied to the primary ring 116 by one or more biasing members 138.

During operation, a flow of a gas sometimes referred to as "buffer gas" is provided to a back side 180 of the primary ring 116 via a buffer gas passage 182. The buffer gas passage 182 can receive the gas from a buffer gas inlet 184 formed in the compressor housing 104.

As generally shown by arrows 150, this gas passes through the primary ring 116 and exits it at or near the seal interface 113 at primary ring face 116a. This gas, in normal operation as shown in FIG. 1, can travel both radially inward (direction B) and radially outward. Gas that travels readily outward can generally pass into the bearing cavity 108. Gas travels radially inward passes between the stator 117 and the sleeve ring 115 (in this case, between the spacer or locking sleeve 115b and the stator 117) and exits the seal chamber 112 via vent 174. The buffer gas is shown generally by arrows 150 that identify the path taken by the gas through the seal 100. The buffer gas can be provided into the buffer gas passage 182 at a buffer gas pressure. Gas that passes through the seal interface 113 in the radially inward direction (direction B) and gas 140 that escapes from the dry gas seal 107 can exit via a vent 174.

Figure 2:
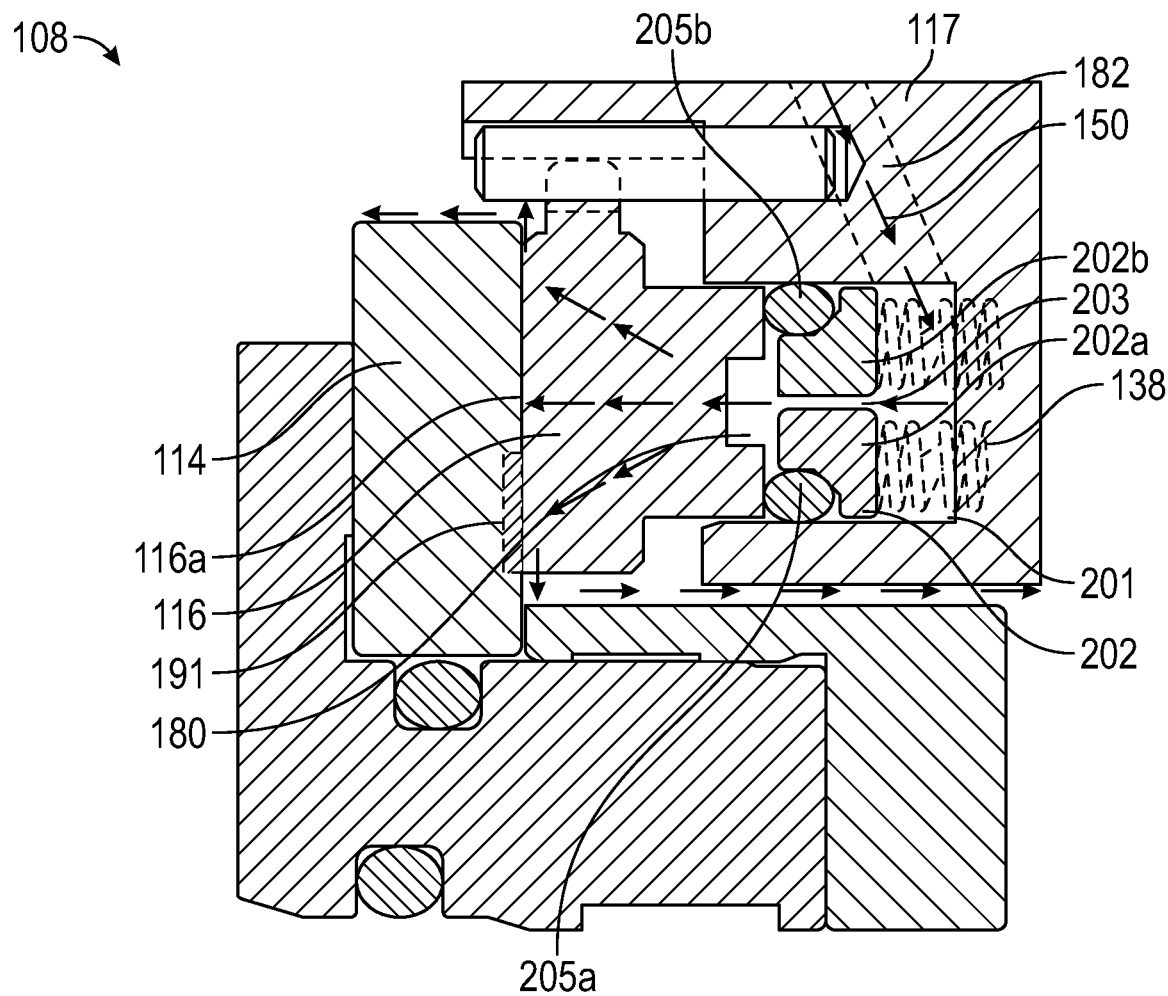
FIG. 2 shows a more detailed version of the seal shown in FIG. 1.

With reference now to both FIGS. 1 and 2, the gas from the buffer gas passage 182 is provided into a primary ring control chamber 201. This chamber is formed in the stator 117. This gas, in combination with the biasing members 138 can bias the primary ring 116 towards the mating ring 114.

As shown, a thrust ring 202 is disposed in the primary ring control chamber 201. The thrust ring 202 includes a passage 203 formed therein that allows the buffer gas 150 to pass through it allowing it to reach the back side 180 of the primary ring 116. The passage 203 can be sized such that gas in buffer gas passage 182 passes through and equalizes pressure on both sides of the thrust ring 202 over time. Based on this pressure balance, both the biasing members 138 and the gas in the primary ring control chamber 201 serve to resist motion of the mating ring in the inboard direction (e.g., opposite of direction A).

In one embodiment, the primary ring 116 is formed of a porous material that allows the buffer gas to pass through it from the back side 180 thereof to its mating ring (or sealing) face 116a. The porous material can be carbon in one embodiment. The primary ring 116 can be configured such that the buffer gas travels from the back side 180 to the primary ring face 116a.

Rotation of the mating ring 114 due to its connection to the rotating shaft 102 will cause some of the buffer gas at the seal interface 113 to be drawn toward the OD. However, due to the pressure of the buffer gas, the gas can travel between the faces towards both the inner and outer diameters of the mating ring 114/primary ring 116 such that it travels in the manner described above. The presence and pressure of the buffer gas 150 at the seal interface 113 and the relative motion of the mating/primary rings 114, 116 results in a so-called "lift off" resulting in physical separation of the rings.

During normal operation, as described above, pressure in the process cavity 106 as well as heat can cause the rotating shaft 102 to move or expand axially. The biasing members 138 can allow for the primary ring 116 to keep a constant distance during operation between itself and the mating ring 114 even as the mating ring 114 moves axially due to such movement of the rotating shaft 102.

One or more radial seals 205 may be provided to direct the buffer gas 150 so that gas leaving the primary ring control chamber 201 travels through the seal interface 113 (e.g., between the primary ring 116 and the stator 117). The seals may be formed of a polymer or an elastomer and one example of such a seal is a lip seal. In FIG. 2 the seal is illustrated as first and second o-rings 205a, 205b but that is by way of example only and not meant to be limiting. The o-rings 205a, 205b also serve to seal the thrust ring 202 and the primary ring 116. Thus, as shown, as the primary ring 116 moves (either due to lift off or shaft movement) the thrust ring 202 will move relative to the stator 117. This motion can result damage to the o-rings 205 in some instances.

Figure 3:
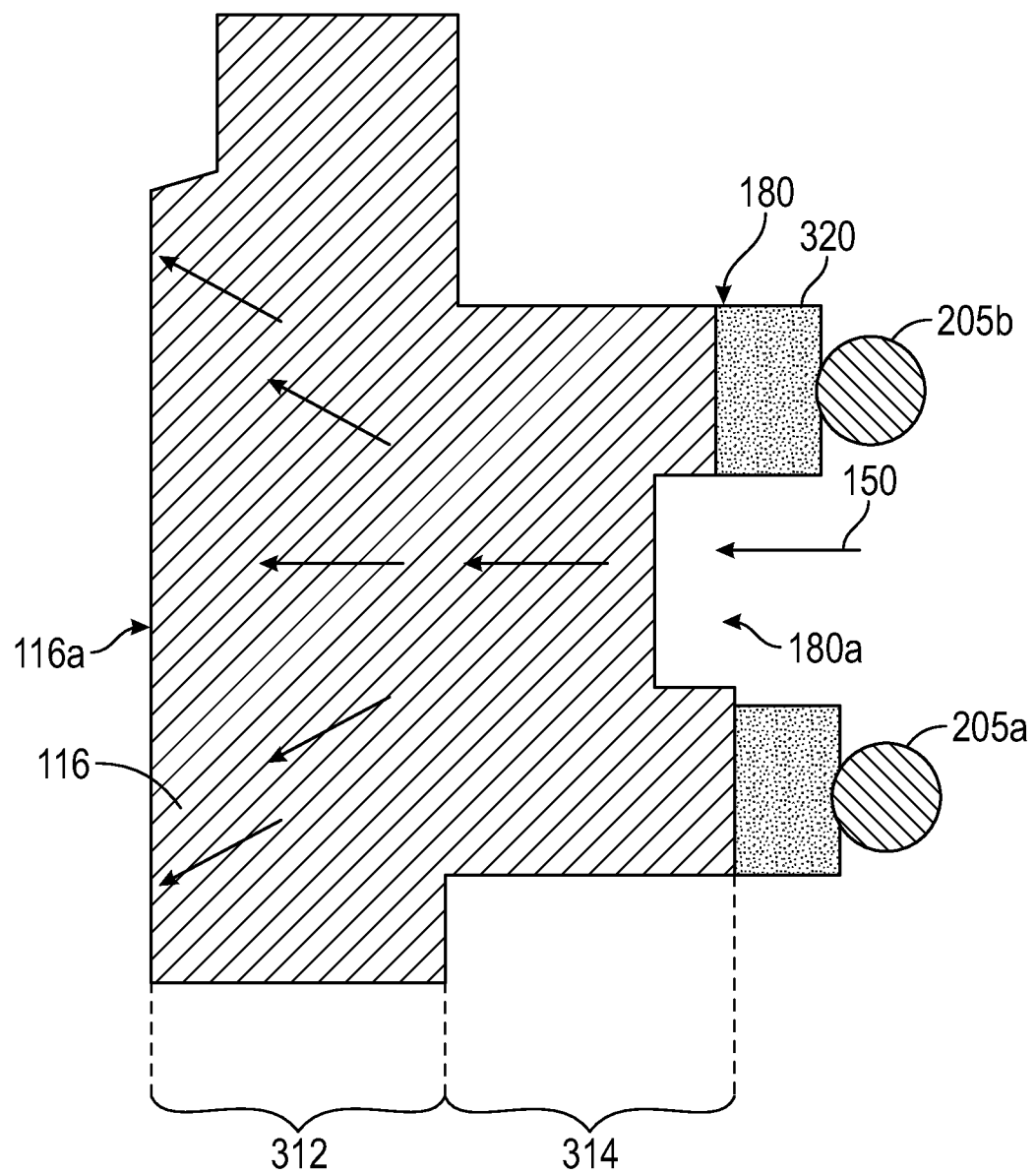
FIG. 3 illustrates a cross-section of a portion of a porous carbon primary ring and a gas flow path therethrough.

With reference now to FIG. 3, an example of the primary ring 116 is shown. The illustrated primary ring 116 can be formed of a porous material such as carbon in one embodiment. The primary ring 116 includes a primary ring face 116a and a back side 180. The primary ring 116 can be configured to promote motion of the buffer gas 150 from the back side to the mating ring face as shown by the arrows in FIG. 3.

In the embodiment shown in FIGS. 1-3 the primary ring 116 includes a front or face portion 312 that includes the primary ring face 116a. The primary ring 116 also includes back section 314. The back section 314 can be narrower than the face portion 312 in one embodiment. As illustrated in FIGS. 1 and 2 some or all of the back section 314 can be disposed within the primary ring control chamber 201. Thus, in one embodiment, the primary ring control chamber 201 is sized and arranged to receive a portion of the primary ring 116 and, in particular, a portion of the back section 314 of the primary ring 116. Further, the primary ring control chamber 201 can also be sized so that it receives at least one sealing member (e.g., radial seal 205) and one thrust ring 202.

The mating ring 114 can include grooves 191 formed therein that draw gas from the inner diameter into the seal interface 113. As more fully described below, these grooves 191 may help to prevent the mating and primary rings 114, 116 from contacting one another in the event that gas flow of the buffer gas ceases or becomes otherwise ineffectual at forming a gas film between the mating and primary rings 114, 116.

The shape of the grooves 191 is optimized to enhance seal performance. As is known in the art, the grooves 191 typically are machined or etched only to the radial midpoint of the face of the mating ring 114 and have a very shallow depth of only a few microns. The grooves are shaped to have a tip such that gas enters the grooves is compressed because of the volume reduction at the tips.

In the above examples, it shall be understood that in normal operation high pressure buffer gas 150 flows through the primary ring 116 to its face 116a at the seal interface 113. In such operation, the buffer gas 150 leaves the interface towards both the bearing and dry gas seal sides (e.g., radially inwardly and radially outwardly). Due to the presence of the grooves 191, potentially, greater flow of the buffer gas 150 is directed radially outward towards the bearing cavity 108 which provides a greater restriction against the bearing oil.

Figure 4:
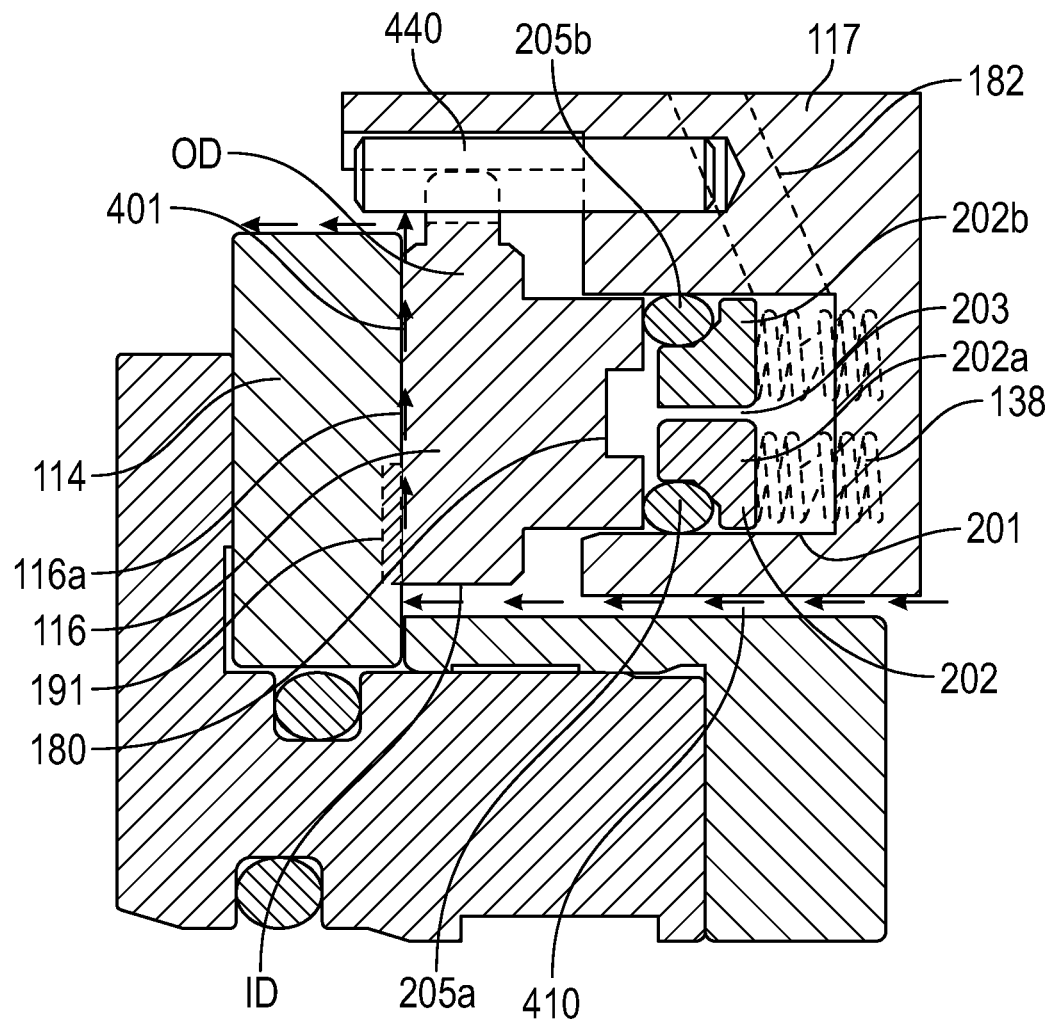
FIG. 4 shows the seal of FIG. 2 operating with a reduced buffer gas supply.

Regardless of particular flow, the pressure from the buffer gas 150 present at the seal interface 113 after passing the porous material of the primary ring 116 creates a thin film (and separation/gap) between the mating and primary rings 114, 116. Such separation can create a non-contacting regime of operation. Further, the pressure of the buffer gas 150 as provided from the inlet 184 can allow for a much greater film stiffness that in a typical non-contacting seal and may provide greater back pressure to resist against oil ingress from the bearing side Embodiments of the present invention may also effectively operate in situations wherein supply of buffer gas 150 is diminished. With reference now to FIG. 4, in the event of diminished buffer gas flow, less gas flows through inlet 184, passage 182, or primary ring 116. In such a case, the grooves 191 will serve to ensure that the mating and primary rings do not contact in manner that they are destroyed or otherwise significantly damaged. As discussed above, the grooves 191 draw in low pressure gas 410 from the dry gas seal side (e.g., at the ID) and pump it through the rotating seal interface 113 to create a radially outward flow 401 towards the OD and the bearing cavity 108. In more detail, as the grooves 191 compress air as the is drawn (or pumped) from the ID towards the OD. As it compresses, the air at the tips of the grooves is compressed and has a higher pressure. The area of slightly higher gas pressure creates a pressure dam and results in the above described "lift off" resulting in physical separation of the mating and primary rings 114, 116. As above, when operating, the grooves 191 will create a thin film (and separation/gap) between the mating ring 114 and primary ring 116. In operation, this gap will be sufficient to prevent premature seal wear by ensuring a non-contacting regime. The grooves 191 can be either uni-directional or bi-directional grooves.

Figure 7:
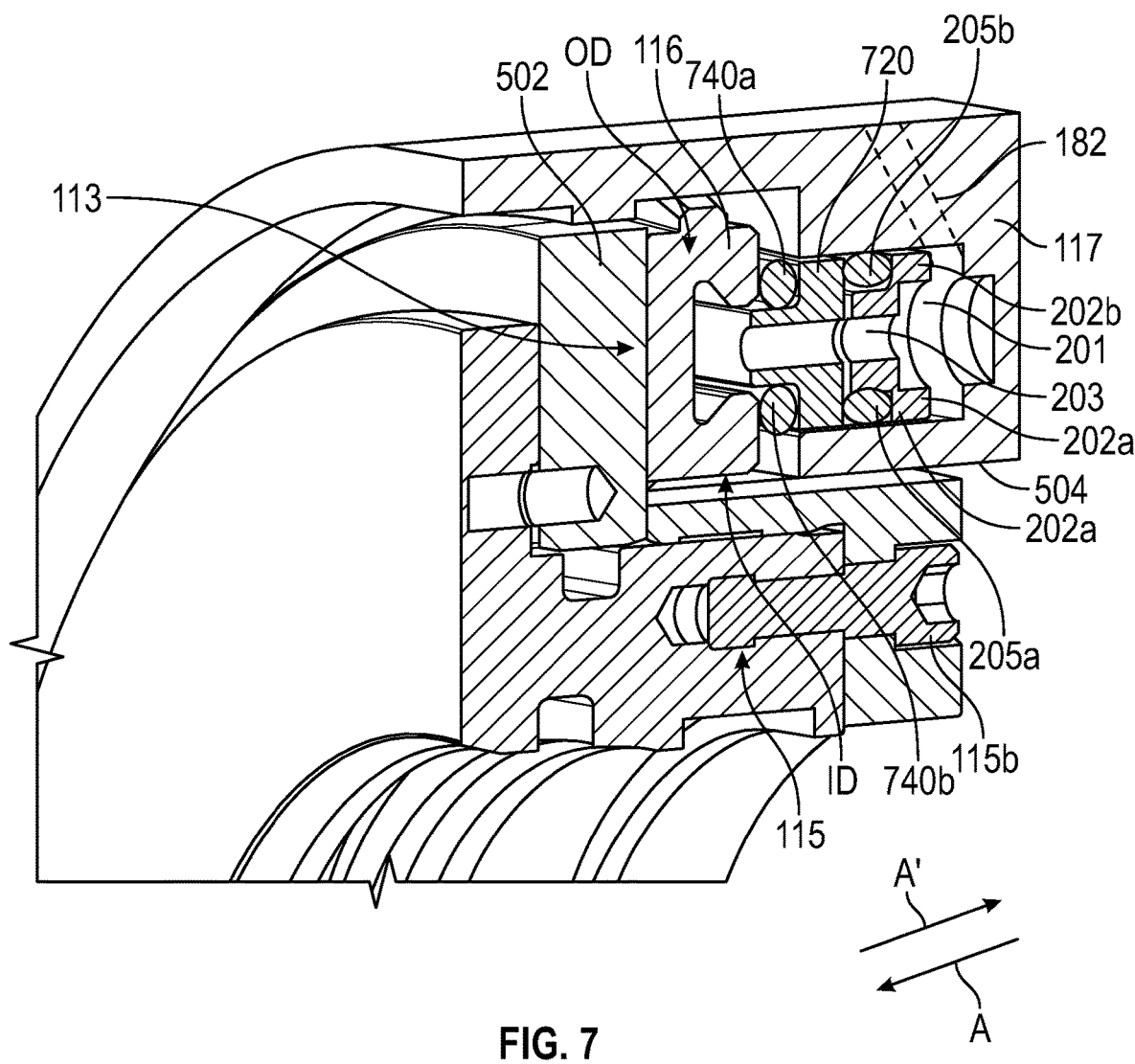
FIG. 7 is a partial-cross section of a separation seal according to one embodiment.

In all of the prior examples the thrust ring 202 has been shown as being formed of two separate pieces (e.g., outer and inner thrust rings 202a/202b). However, the ring can be formed as a single piece. An example of such a single piece ring 202 is shown in FIG. 7. In such a case, the above description is generally applicable. It should be noted that such a single ring can be used in any embodiment disclosed herein.

Figure 5:
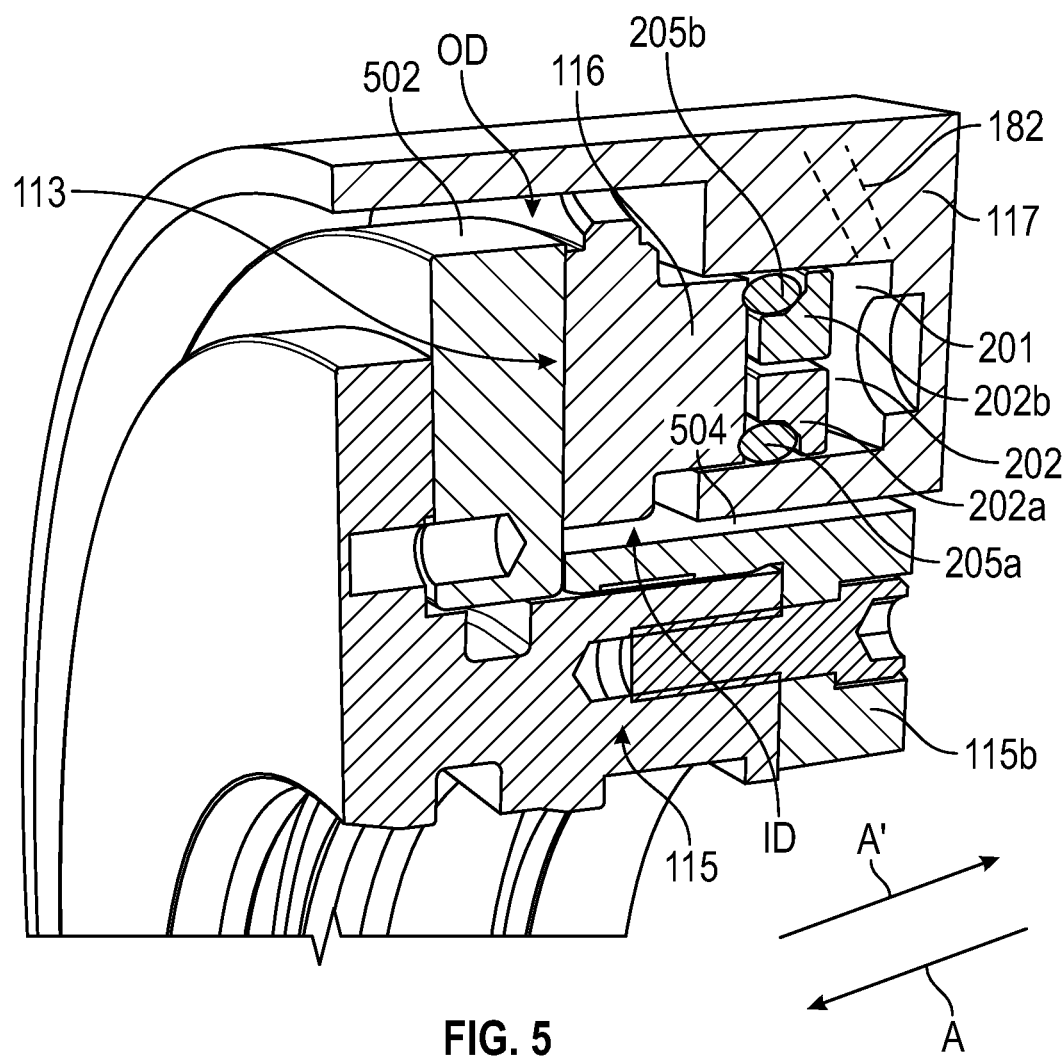
FIG. 5 is a partial cut-away view of the seal of FIG. 2.
Figure 8:
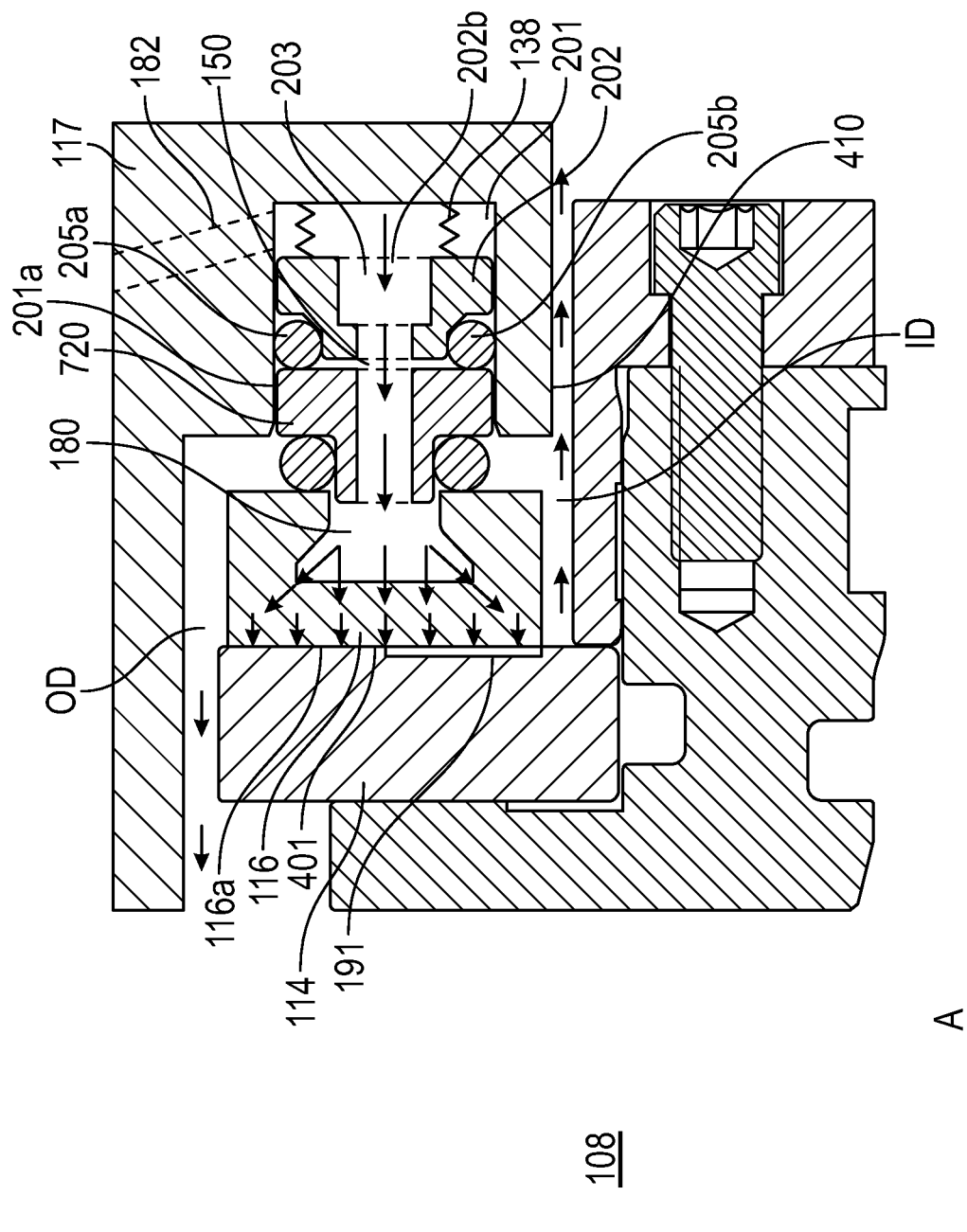
FIG. 8 is a cross section of the separation seal of FIG. 7.

FIG. 5 shows cut-away perspective view of the seal 100 of the prior embodiments that includes a two-piece thrust ring 202. This cross section is shown without shaft and is used to show relative spacing and to identify the gas outlet passages in more detail. In particular, gas that exits the seal interface 113 as the ID of the primary ring 116 can traverse the inboard or dry gas seal side passage way 504 in the inboard direction (direction A'). This gas can be released via vent 174 (FIG. 1) to atmosphere in one embodiment. The thrust ring 202 can either be formed as a single ring with one or more passages 203 (e.g., holes) formed therein or it can be formed of two different elements where spaces between the elements define the passageway (see, e.g., elements 202a/202b in FIG. 6 below). For reference, a single ring thrust ring is also shown in FIGS. 7 and 8 below and such a ring can be used in all embodiments.

Similarly, gas that exits the seal interface 113 as the OD of the primary ring 116 can traverse the outboard passageway 502 in the outboard direction A. This gas can be released via vent 174 (FIG. 1) to atmosphere in one embodiment.

Figure 6:
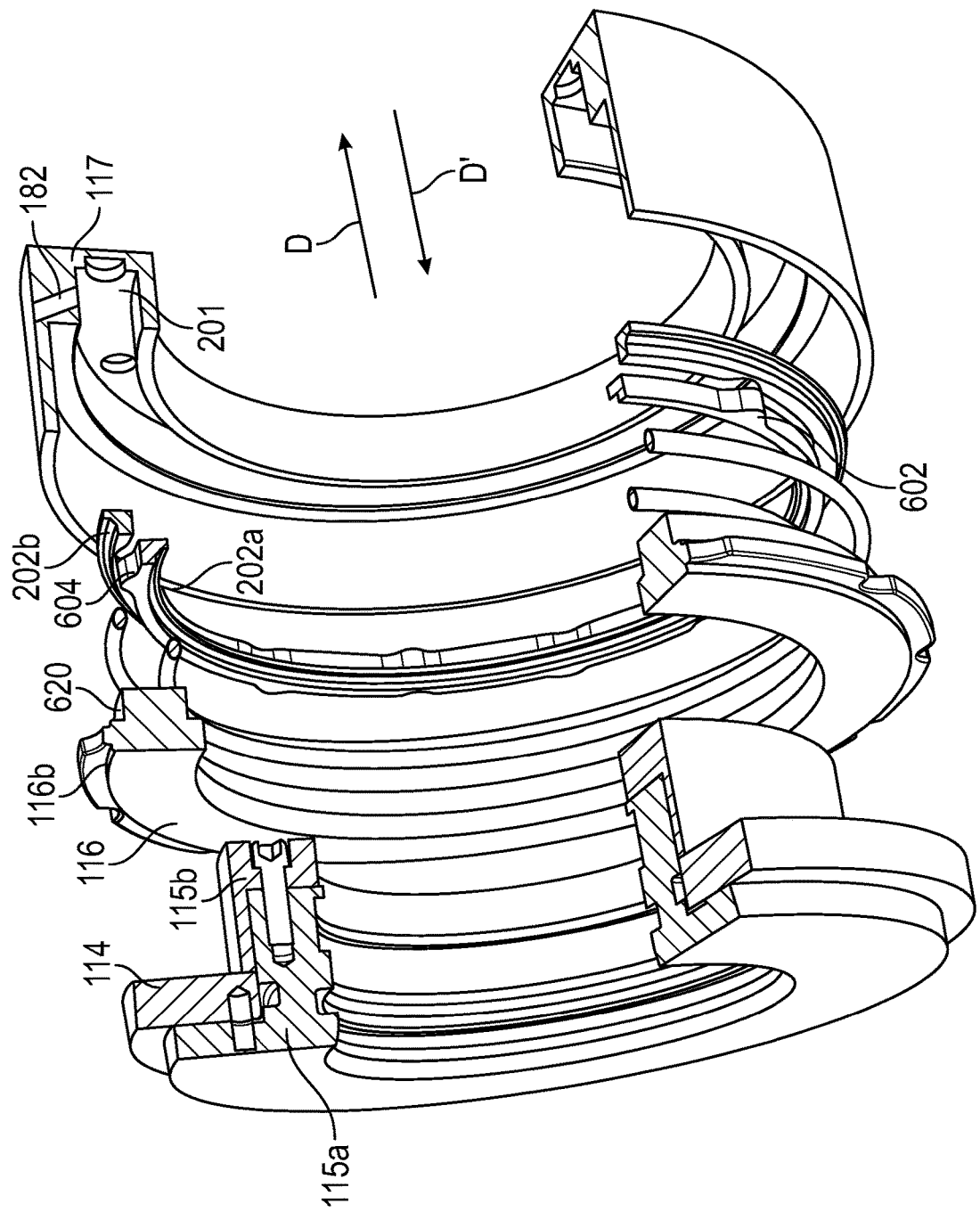
FIG. 6 is an exploded view of the seal of FIG. 2.

In FIG. 6 certain aspects of the prior embodiments are illustrated for further clarity. The illustrated seal 100 includes, as above, a stator 117. The stator 117 can be formed as a ring. The stator 117 can define primary ring control chamber 201 into which the thrust ring 202 is disposed. The thrust ring 202 can be single ring with passageways (holes) formed therein as discussed above.

The rings 202a, 202b are preferably shaped and arranged such that, when mated, one or more passageways exist between them through which buffer gas 150 described above can pass. The rings 202a, 202b shown in FIG. 6 include mating elements such as mating tabs 602 (on ring 202a) and receiving regions 604 (on ring 202b) to allow the rings to separate in operation. Other types of mating elements could be utilized. In one embodiment, the tabs 106 can house the biasing elements. As discussed further below, in some instances, the rings 202a, 202b can separate in certain circumstance with relative movement between the two in the inboard direction A'. In the example discussed below, the inner ring 202a can move axially inward relative to the outer thrust ring 202b. Motion in the other direction will be stopped by the back 620 of the primary ring 116 (or another element such as ring 320 of FIG. 3 or another thrust ring as shown below).

Inner and outer seals (o-rings 205a, 205b), are disposed between the respective inner and outer rings 202a, 202b and the back 620 of the mating rings. These seals can serve to seal the back section 314 of the primary ring 116 in the primary ring control chamber 201 in this embodiment.

With reference to FIGS. 4 and 6, one or more retaining elements 440 can be provided that mates with a ring extensions 116b of the primary ring 116 to align the ring during assembly. Such retaining elements 440 are optional and can be omitted in certain instances.

As above and with reference now to FIGS. 5-6, generally, in operation buffer gas 150 is introduced from a gas supply. The buffer gas 150 can be an inert gas such as nitrogen, helium, neon, or argon. The gas 150 is provided into the primary ring control chamber 201 and generally urges the primary ring 116 (and the first and second thrust rings 202, 720) in the outboard direction A. It shall be understood the biasing members 138 discussed above also urge the primary ring 116 towards the mating ring 114.

The buffer gas 150 travels through the porous material of the primary ring 116 from its back 620 and exits at the primary ring 116 at its face 116a (e.g., at the seal interface 113 formed between the mating and primary rings 114/116).

As discussed in the above examples, the embodiments herein include primary ring control chamber 201 that includes at least one thrust ring 202 disposed at least partially therein. Further, as shown in FIGS. 7 and 8, portions of a second thrust ring 720 can also be disposed in the in primary ring control chamber 201. Additionally or alternatively, in some cases another ring, such as ring 320 shown in FIG. 3 can be disposed between the thrust ring 202 and the back 620 of the porous primary ring 116. Thus, the embodiment of FIG. 7 can be said to include a first thrust ring 202 and a second thrust ring 720 (of course, the ring 202 of any prior embodiment can be referred to as first thrust ring in some instances).

The seal shown in FIG. 7 is illustrated without a shaft and is used to show relative spacing of the first and second thrust rings 202, 720 and to identify the gas outlet passages. In particular, gas that exits the seal interface 113 as the ID of the primary ring 116 can traverse the inboard or dry gas seal side passage way 504 in the inboard direction (direction A'). This gas can be released via vent 174 (FIG. 1) to atmosphere in one embodiment. Similarly, gas that exits the seal interface 113 as the OD of the primary ring 116 can traverse the outboard passage way 502 in the outboard direction A. This gas can be released via vent 174 (FIG. 1) to atmosphere in one embodiment.

With reference to both FIGS. 7 and 8, and as in the prior embodiments, the primary ring control chamber 201 can include one or more biasing members 138 that urge the first thrust ring 202 towards the mating ring 114 (e.g., in the outboard direction A). The buffer gas enters the primary ring control chamber 201 via inlet 182 as above also serves to urge the first thrust ring 202 in the outboard direction.

The first thrust ring 202 can either be formed as a single ring with one or more passages 203 (e.g., holes) formed therein. Of course, it could be formed as a split ring as described above. As illustrated, all of the first thrust ring 202 is disposed in the primary ring control chamber 201. The seal 100 includes first and second sealing elements 205a, 205b. These can be any type of sealing elements and, as illustrated, are formed as o-rings. The first and second sealing elements 205a, 205b direct the gas in primary ring control chamber 201 through the passage 203 formed in the first thrust ring 202. The first and second sealing elements 205a, 205b also form a seal between the first thrust ring 202 and the second thrust ring 720 so that barrier gas in primary ring control chamber 201 is directed through the back 180 of the porous primary ring 116 and then through the primary ring 116 to the face 116a.

As shown best in FIG. 8, one or more sealing elements 740a, 740b are disposed between the second thrust ring 720 and the back of the porous primary ring 116. The second thrust ring 720 can be shaped and arranged such that it maintains the sealing elements 740a, 740b between it and the primary ring 116. Further, the second thrust ring 720 can be shaped and arranged such that it and the first thrust ring 202 move, the sealing elements 740a, 740b do not contact any stationary surface (e.g., the walls 201a of the primary ring control chamber 201). This can avoid possible damage to sealing elements 740a, 740b in some embodiments.

In general, the embodiment shown in FIGS. 7 and 8 operates in generally the same manner as described above. It should be noted that the porous primary ring 116 can be the same or similar to that as described above. However, in aspects of this embodiment, the back section 314 (FIG. 3) of the porous primary ring 116 may not be disposed within the primary ring control chamber 201. In one particular, embodiment, none of the back section 314 of the porous primary ring 116 is disposed within the primary ring control chamber 201. In another, some of the back section 314 (FIG. 3) of the porous primary ring 116 can be disposed within the primary ring control chamber 201 but in such a case it may be preferable to ensure that neither of the sealing elements 740a, 740b can contact the walls 201a of the primary ring control chamber 201.

As above and with reference now to FIGS. 7-8, generally, in operation buffer gas 150 is introduced from a gas supply. The buffer gas 150 can be an inert gas such as nitrogen, helium, neon, or argon or any other type of gas (e.g., air). The gas 150 is provided into the primary ring control chamber 201 and generally urges the primary ring 116 (and the thrust ring 202) in the outboard direction A. The biasing members 138 discussed above also urge the primary ring 116 towards the mating ring 114.

The buffer gas 150 passes through the first and second thrust rings 202, 720 and then travels through the porous material of the primary ring 116 from its back 620 and exits at the primary ring 116 at its face 116a (e.g., at the seal interface 113 formed between the mating and primary rings 114/116).

In the case a reduction in buffer gas supply, the seal will operate as described above with respect to FIG. 4. In the event of buffer gas reduction, gas may not longer appreciably flow through inlet 184, passage 182, or primary ring 116. In such a case, the grooves 191 will serve to ensure that the mating and primary rings do not contact in a manner that they are destroyed or otherwise significantly damaged. As discussed above, the grooves 191 draw in low pressure gas from the dry gas seal side (e.g., at the ID) and pump it through the rotating seal interface 113 to create a radially outward flow towards the OD and the bearing cavity 108. In operation, this gap will be sufficient to prevent premature seal wear by ensuring a non-contacting regime.

In the prior description the seal including a porous primary ring was illustrated as a separation seal that was separate from the dry gas seal. In another embodiment, and a shown in FIG. 9, such a seal can also be utilized as a back-up or containment seal of dry gas seal that includes two seals (e.g., a tandem seal). In particular, the dry gas seal assembly 900 includes in first or primary seal 902 and a secondary, back-up or containment seal 904 (secondary seal hereinafter). The secondary seal 904 includes primary ring 116 formed of a porous material is in the above.

At least a portion of the dry gas seal assembly 900 is positioned between a rotating compressor shaft 102 and a compressor housing 104. The rotating compressor shaft 102 is generally part of a compressor and is operably coupled to a compressor impeller (not shown) disposed in a process cavity 106 of the compressor, and is supported by the housing 104 via a bearing (not shown) disposed in a bearing cavity 108 of the housing 104. The rotating compressor shaft 102 is the rotor of the compressor in most instances and may be referred to simply as a rotating shaft from time to time herein. It shall be understood that the rotating shaft need not be the rotor of the compressor itself but could be any shaft connected to the rotor that rotates with it around which a seal needs to be provided.

The compressor housing 104 includes a bore 109 formed in it that extends between the process cavity 106 and the bearing cavity 108 and defines an annular seal chamber 112 into which the dry gas seal assembly 900 may be inserted. The process cavity 106 includes the gas (typically a hydrocarbon) being compressed by the compressor. That gas is referred to as process gas herein.

An optional shroud not shown that may include a labyrinth seal and which extends over a radially extending opening formed between the rotating shaft 102 and the compressor housing 104 may be provided to inhibit the free flow of process gas from the process cavity 106 into the bore 109. The shroud 126 is disposed in the bore 109 and, as illustrated carries a labyrinth seal 128 that serves to totally or partially prevent the free flow of process gas from the process cavity 106 into the bore 109. The combination of the shroud 126 and the labyrinth seal 128 extends over a radially extending opening formed between the rotating shaft 102 and the compressor housing 104. As illustrated, the shroud 126 and the labyrinth seal 128 are shown as two separate items but they could be formed as an integrated unit in one embodiment. The dry gas seal assembly 900 illustrated in FIG. 9 includes the first seal 902 and the secondary seal 904. Typically the components of the first and second seals 902/904 are preassembled into a cartridge and then disposed in the seal chamber 112. The cartridge 118 includes a first stator 917 that can be formed of one or more components and joined in a fixed relationship to one another as well as with the compressor housing 104 when installed.

The cartridge can also include a sleeve ring 115 that can be formed of one or more components and that that is attached to the rotating shaft 102 such that it rotates with the rotating shaft 102. The illustrated sleeve ring 115 includes four portions 915, 917, 919, 921. The first portion 915 carries rotating portions of the first seal 902 and the fourth portion 921 carries rotating portions of the secondary seal 904. As shown, two spacer rings 917, 919 are located between the first and second portions of the sleeve ring. The portions can be formed as rotating rings configured to contact and rotate with the rotating shaft 102. Of course, the sleeve ring could be formed as a unitary piece or could include any number of pieces that are either joined together or otherwise held stationary relative to each other during operation (e.g., all pieces rotate together as one).

Assuming that the process gas in the process cavity 106 is under pressure, all components of the dry gas seal assembly 900 are urged in the direction toward thrust rings 121 and 125 (direction A) during operation. Axial movement of the primary dry gas seal 902 relative to the rotating shaft 102 is limited by a shaft thrust ring 125 received in a groove in the rotating shaft 102.

In the above example, it should be understood that the shaft thrust ring 125 can be fixed relative to the sleeve rings so that the two elements rotate together. Also, for sake of completeness, it shall be understood that other elements can be attached to the sleeves to provide support or other functions but are not specifically described herein.

The portion 915 carries and otherwise mates first seal rotating or mating ring 914 to the rotating shaft 102. That is, the portion 915 is mated to the rotating shaft 102 allows the first seal mating ring 914 to also rotate with the shaft 102. First mating ring 914 can include one or more grooves (not shown) formed on a face thereof.

It shall be understood that during normal operation the secondary seal 904 operates in the same manner as described above with respect to FIGS. 1-4 with the gas 150 traveling in the manner shown in FIG. 2. That is, buffer gas 150 enters the primary ring control chamber 201 via the buffer gas passage 182. As above, this gas passes through the primary ring 116 and exits it at or near the seal interface 113 at primary ring face 116a. This gas, in normal operation, can travel along the seal interface 113 both radially inward (direction B) and radially outward (direction B'). Gas that travels radially outward can generally pass into the bearing cavity 108. Gas travels radially inward passes between the stator 117 and the sleeve ring 115 (in this case, between the third portion 919 and the stator 117) exits the seal chamber 112 via vent 974 after passing vent chamber 974a. The buffer gas can be provided into the buffer gas passage 182 at a buffer gas pressure. In the event of a reduction of the buffer gas flow, the secondary seal 904 will draw gas from the vent chamber 974a due to grooves 191 as described above. Further operation of the secondary seal 904 is described below.

During operation, gas present in the process cavity 106, which can reach pressures of 6,500 PSI-G (450 BAR-G) or above, is sealed from the bearing cavity 108 and from the environment by the interaction of the first seal mating ring 914 and a first seal primary ring 916. The first seal primary ring 916 can also be referred as a stationary ring as it does not rotate with the shaft and is thus, generally or completely, rotationally stationary relative to the housing during operation. Reference numeral 913 identifies the location of the seal interface formed between the first seal mating ring 914 and the first seal primary ring 916.

As will be understood by the skilled artisan, the first seal primary ring 916 is axially movable relative to the housing 104 during operation such that a controlled distance may be maintained between the first seal mating ring 914 and the first seal primary ring 916 at the seal interface 913. In the illustrated embodiment, a spring force is applied to the first seal primary ring 916 by one or more biasing members 938 disposed between a retainer ring 917a and the first seal primary ring 916. As shown, the biasing members 938 are disposed between the stator 917 and a carrier ring 970 that is attached to or otherwise contacts the first seal primary ring 916. The skill artisan will realize that in different types of seals, the primary/first seal design and geometry may be varied from that shown in FIG. 9 and embodiments herein are not limited to particular primary/first seal design and geometry shown here.

During operation, some of the process gas travels between the seal interface 913 of the first seal mating and primary rings 914, 916. The process gas that so travels is identified by arrow 950.

In more detail, of rotation of the first seal mating ring 914 due to its connection to the rotating shaft 102 and/or pressure of the process gas in the process chamber 106 will cause some of the process gas to be drawn from an outer diameter of the first seal mating ring 914 into the groves formed therein. The shape of the grooves is optimized to enhance seal performance. As is known in the art, the grooves typically are machined only to the radial midpoint of the face of the first seal mating ring 914 and have a very shallow depth of only a few microns. The grooves can be shaped to have a tip such that gas enters the grooves is compressed because of the volume reduction at the tips. The area of slightly higher gas pressure creates a pressure dam and results in a so-called "lift off" resulting in physical separation of the primary and mating rings 914, 916. As such, in operation, gas flows over the dam area (between the primary and mating rings 914, 916) to a low pressure side 960 of the first seal interface 913. Gas that passes through the seal interface can exit the dry gas seal assembly 100 via a vent 974 in the compressor housing 104.

To allow for the above described lift off, the carrier ring 970 is provided as a means for allowing the required movement. The carrier ring 970 is coupled to the stator 917 by the biasing members 938. The biasing members 938 can be a singular element or composed of a plurality elements. The biasing members 938 are comprised of one or more springs in one embodiment. Of course, the shape and design of the carrier ring in the first seal can be varied.

During operation, as described above, pressure in the process cavity 106 as well as heat can cause the rotating shaft 102 to move or expand axially. The biasing members 938 can allow for the first seal primary ring 916 to keep a constant distance during operation between itself and the first seal mating ring 914 even as the mating ring 914 moves axially due to such movement of the rotating shaft 102.

As mentioned above, the secondary seal 904 receives a flow a buffer gas. It shall be understood that the secondary seal can be formed in the same or similar to any prior disclosed embodiment of FIGS. 1-8. Thus, the discussion related there is incorporated as if fully restated here.

Figure 9:
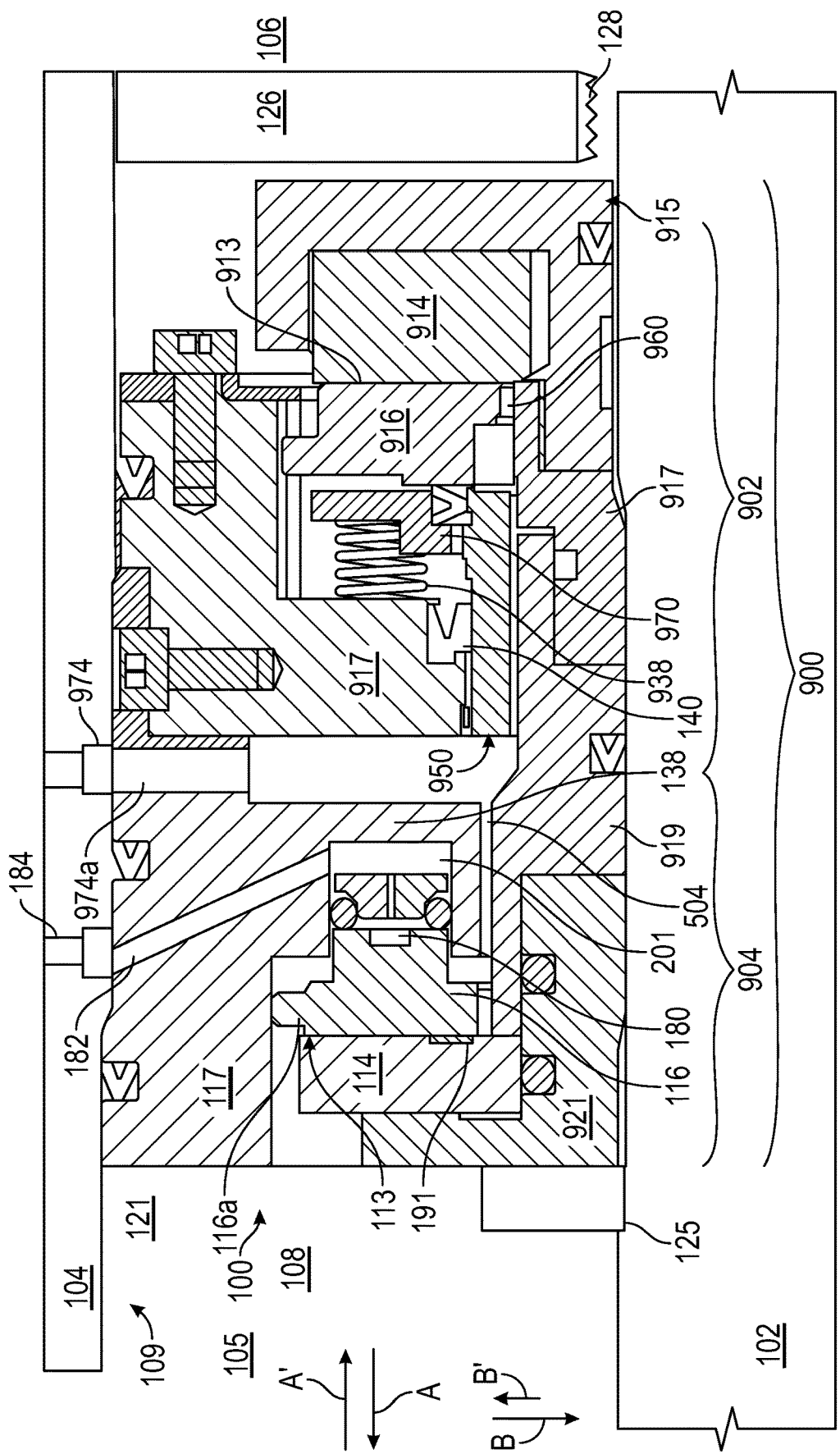
FIG. 9 shows as example seal assembly including a primary seal and a secondary seal where the secondary seal is illustrated as being the same or similar to that shown in FIGS. 1-3.

The gas, after passing through the seal interface 113 travels both radially and axially outward to the bearing cavity 108 and radially and axially inward (direction A') towards the process cavity 106. In FIG. 9, a vent 974 (including a vent passage 974a) is provided that allows for the controlled release of both axially inward traveling buffer gas and process gas 950 that has passed through first seal interface 913 to escape during normal operation. Such vents are known in the art and can typically include a choke that limits gas flow to a level at or below about 3-4 barg.

In normal operation, the pressure in the vent 974 is roughly atmospheric or slightly higher. In the event that the buffer gas flow is reduced, the secondary seal 904 will operate in the manner as described above with respect to FIG. 4 and draw gas from the vent 974 though the dry gas seal side passage way 504 in the axially outward direction A.

Figure 10:
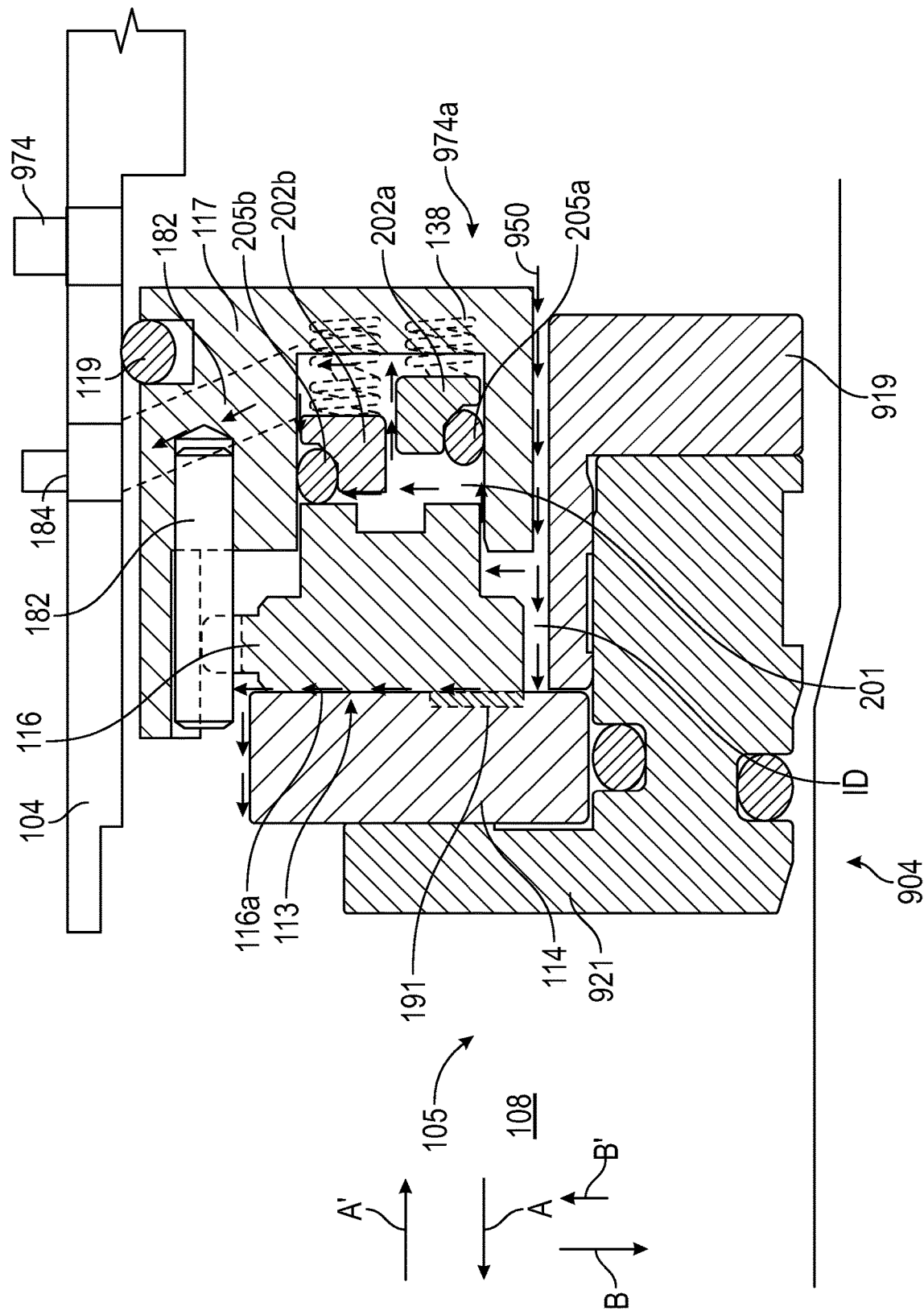
FIG. 10 shows the secondary seal of FIG. 9 operating during an increased flow of a fluid through the primary seal.

In the event that the primary seal 902 is leaking, and now with reference to FIG. 10 which shows the secondary seal 904 operating in such a condition, gas will escape from the primary seal 902 and reach the vent passage 974a. As discussed above, the vent 974 includes a choke that will generally prevent the gas from escaping. In some cases, gas leaking through the first seal will raise the pressure of gas supplied to the vent chamber passage 974a above what the choke will allow to escape. As shown in FIG. 10, this may result in the process gas 950 traveling from the vent chamber 974a in the axially outward (direction A) through the dry gas seal side passage way 504 to the ID of the primary ring 116 at a higher pressure than in normal operation (e.g., above the pressure allowed to escape via the choke).

The high pressure process gas 950 can also cause the inner thrust ring 202a and inner seal 205a to be pushed axially inward as illustrated in FIG. 10. When this happens, the pressure behind the porous primary ring 116 will become approximately equal to the pressure of the process gas 950 leaking through the first seal and the pressure at the seal interface 113 will generally be lower and will decay in the gap from the ID to the OD. It shall be understood that the process gas 950 will be kept from fully escaping from the primary ring control chamber 201 due a choke in the vent 184.

After the pressure has stabilized in the primary ring control chamber 201, the outer thrust ring 202 defines a new balance diameter of the secondary seal 904 and grooves 191 in the mating ring 114 will draw the high pressure process gas 950 from the ID and through the sealing interface 113 to create level flow towards the bearing chamber 108. In this manner, the secondary seal 904 can maintain a positive restriction in this catastrophic event and prevent extreme leakage of pressurised gas into the atmosphere.

Figure 11:
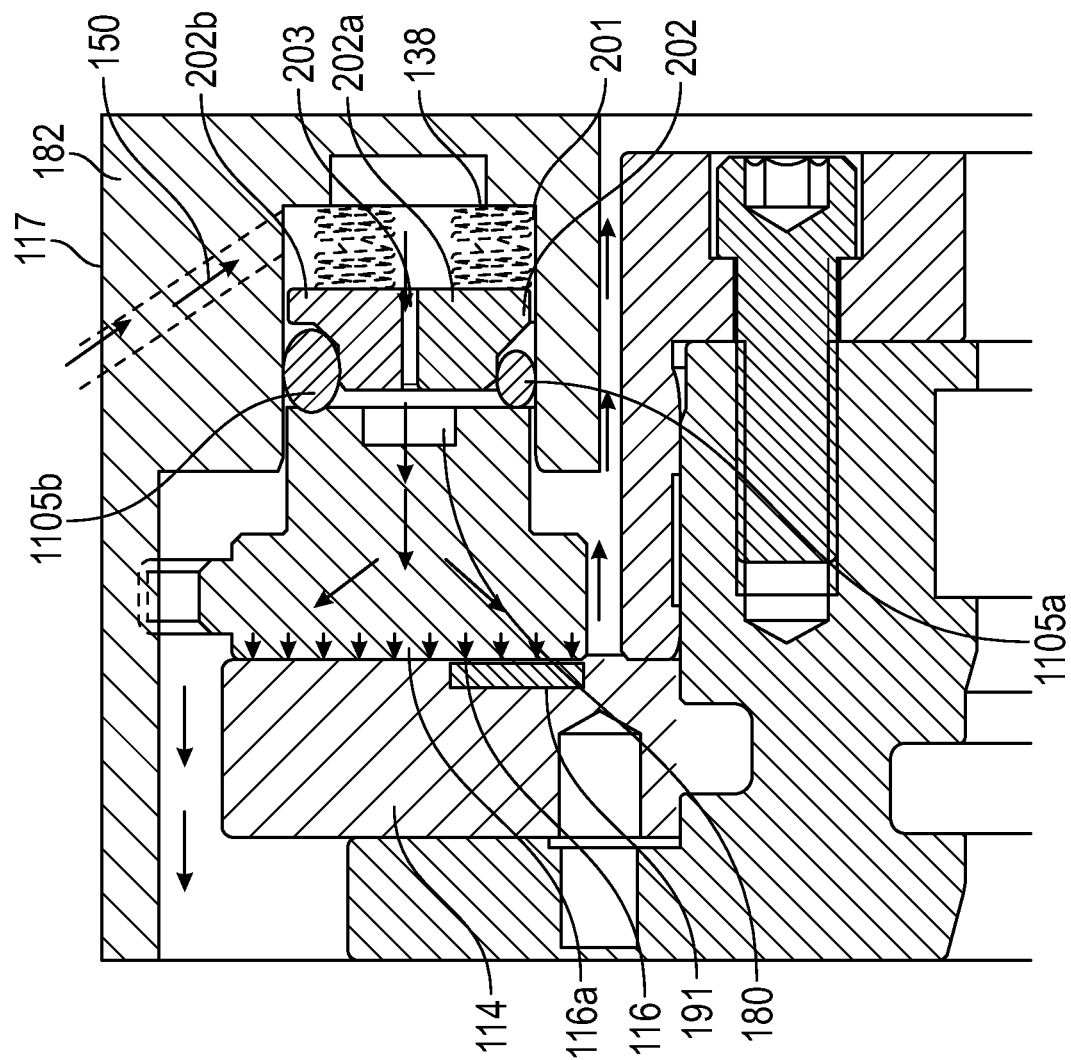
FIG. 11 shows an example of a seal that include sealing members having different sizes/diameters.
Figure 11:
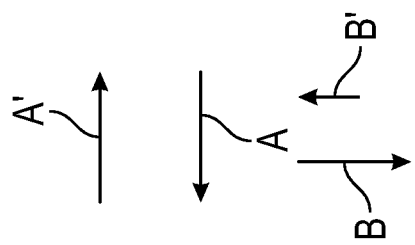

There are several variations that can applied to the teachings herein. For example, and a shown in FIG. 11, the radial seals 205 of any prior embodiment can be implemented as o-rings. These o-rings can have different diameters. As shown in FIG. 11, the first o-ring 110ba has a smaller cross-sectional diameter than the second o-ring 1105b. In another embodiment, this relationship could be reversed with the first o-ring 1105a having a larger diameter than the second o-ring 1105b.

In FIG. 11 and the figures that follow, gas flow paths are shown in the normal operating state. It shall be understood that the embodiments in these figures can all operate in all of the various conditions discussed above.

Figure 12:
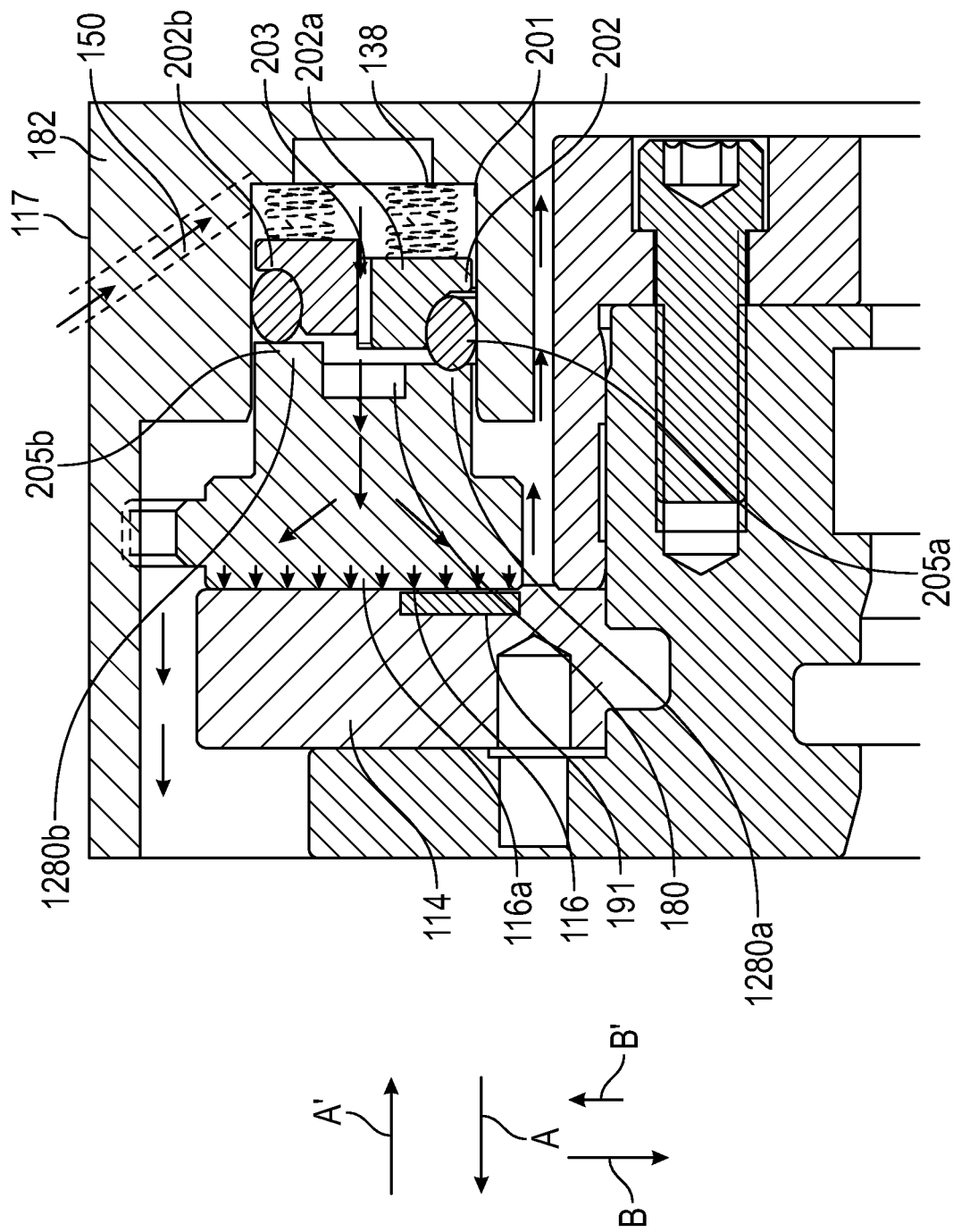
FIG. 12 shows an example of a seal where a back of the primary ring provides different sealing planes.

In another embodiment, and as shown in FIG. 12, the back 180 of the primary ring 116 can be configured such that it defines uneven sealing planes. For example, the outer sealing plane 1280b at the back of the primary ring 116 can be axially inboard relative to the inner sealing plane 1280a at the back of the primary ring. This will result in a slight adjustment in alignment of the front (outboard) faces of the inner and outer thrust rings 202a/202b.

Figure 13A:
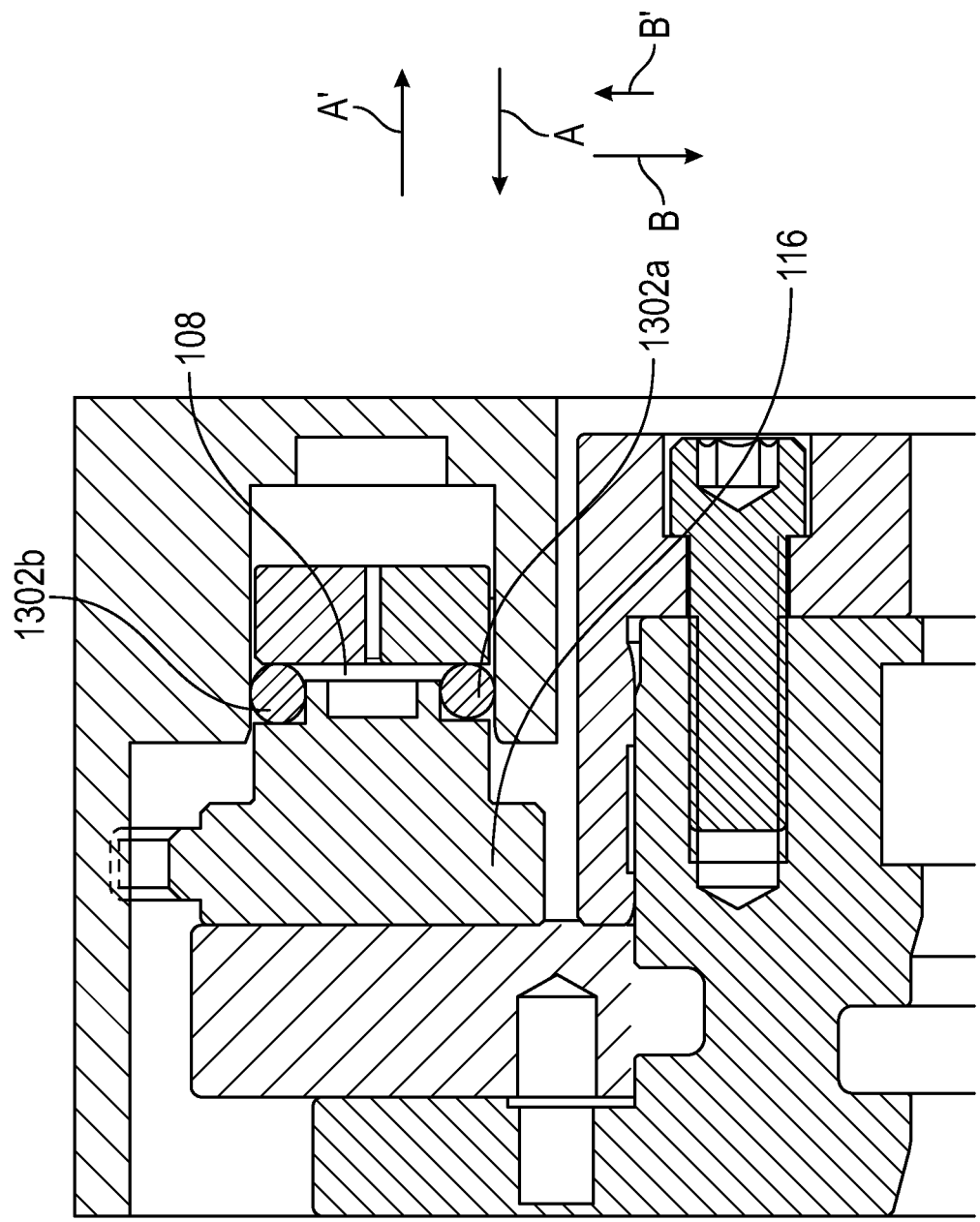
FIGS. 13a and 13b show examples of a seal where a back of the primary ring provides different sealing planes due the formation of grooves therein.
Figure 13B:
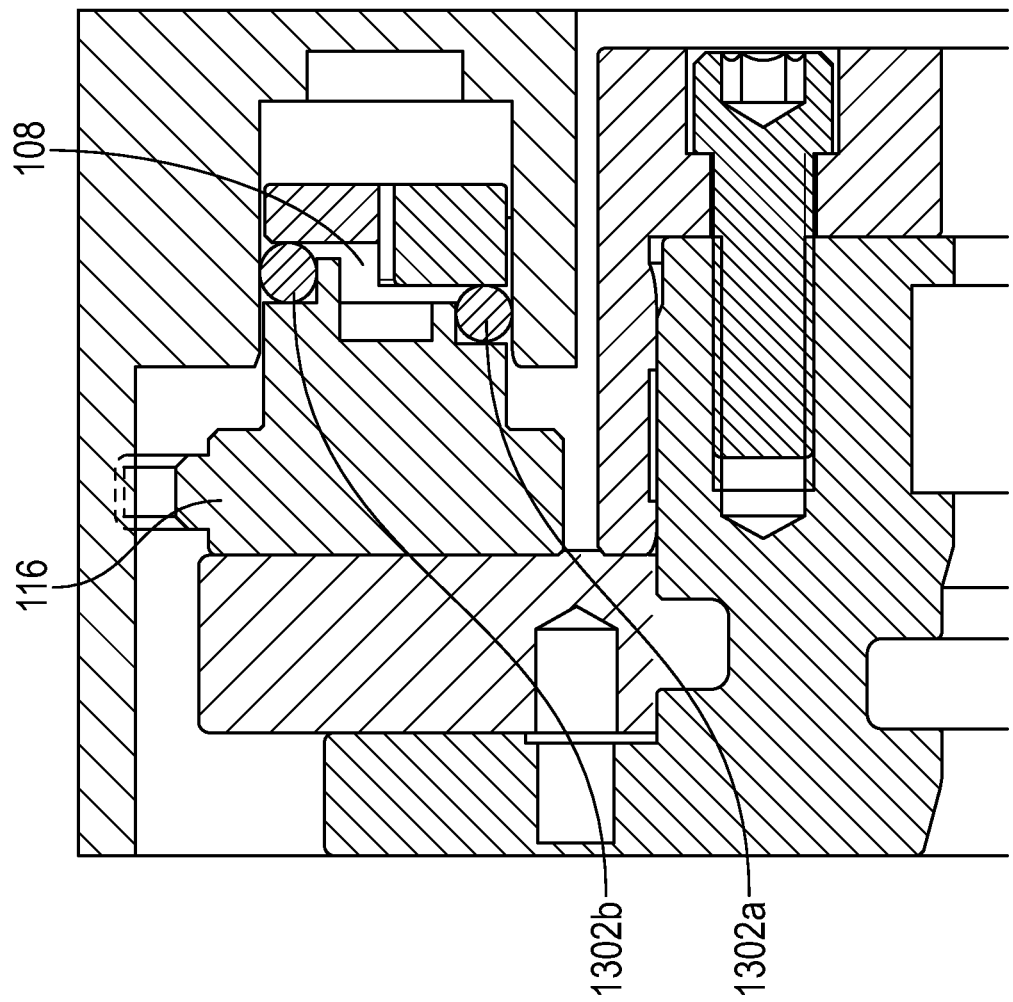

It shall be understood that additional variations in the back of the primary ring are contemplated. For instance, grooves 1302a/1302b can be formed in the back 180 of the primary ring 116 as shown in FIG. 13a. This concept of grooves can be extended or otherwise combined with variation of sealing planes of FIG. 12 to provide an grooved planes where an outer sealing plane 1380b at the back of the primary ring can be axially inboard relative to the inner sealing plane 1380a at the back of the primary ring.

Figure 14A:
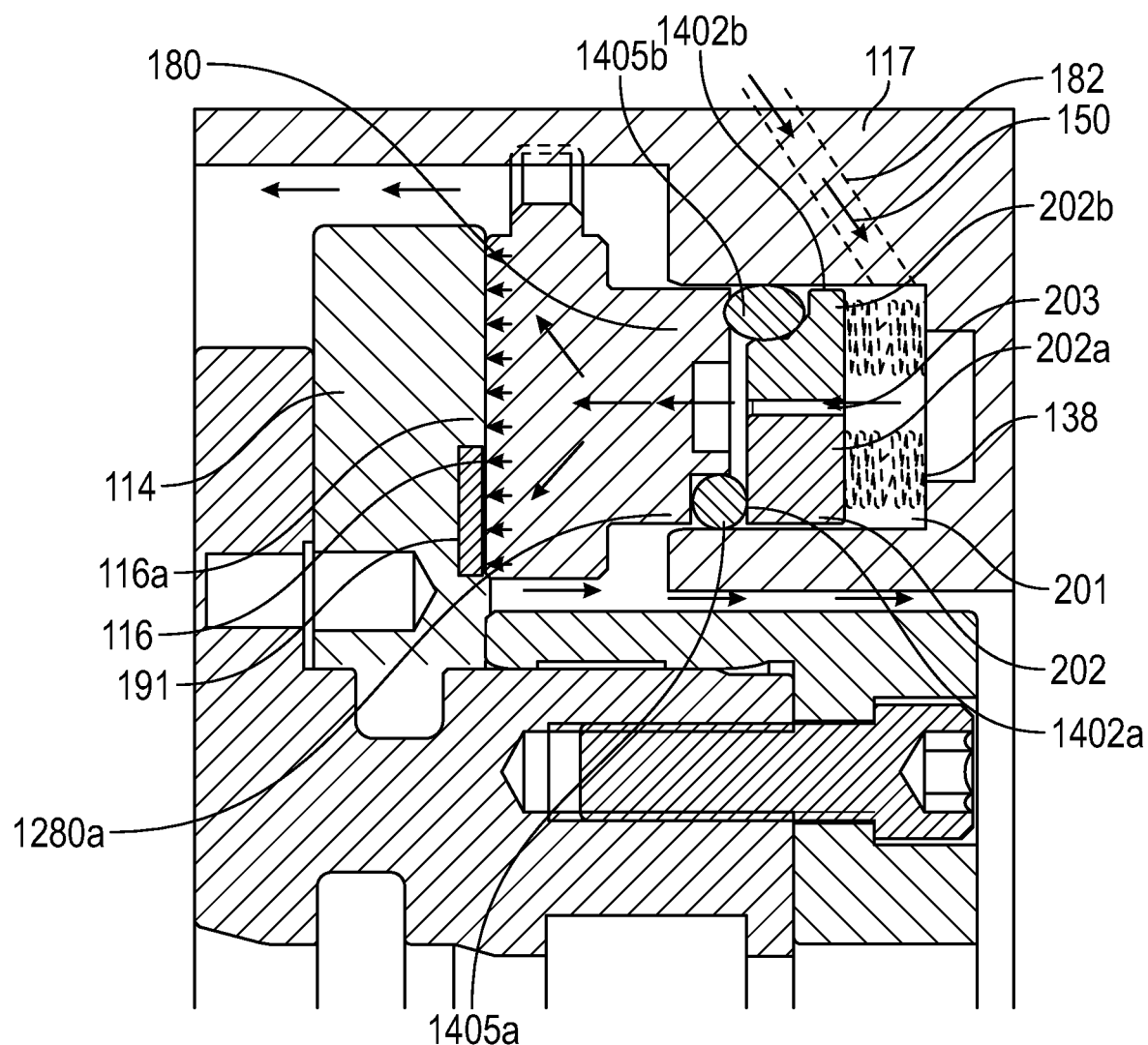
FIGS. 14a and 14b show different combinations of seals having a combination of grooves in the back of the primary ring and different front planes on the inner and outer thrust rings.

In the prior embodiments having grooves in the back of the primary ring 116, it should be understood that one of the grooves could be omitted. Further, in such cases, while not required, one of more of the outboard faces of the thrust ring could be adjusted so that it does not include a receiving area for an o-ring (FIG. 14a/14b). In more detail, the outer thrust ring 202b in FIG. 14a includes a receiving area 1402b to receive the outer o-ring 1405b. The front face 1402a of the inner thrust ring 202a in FIG. 14a is shown as being substantially planar. This variation will result in changes in the sealing planes and could be used with primary ring 116 that includes the groove 1280a shown in FIG. 14a or with any primary ring 116 shown herein (e.g., without or without grooves in it back).

In FIGS. 14a/14b different sized o-rings 1405a/1405b are illustrated but that is not required and they could be of the same diameter.

Figure 14B:
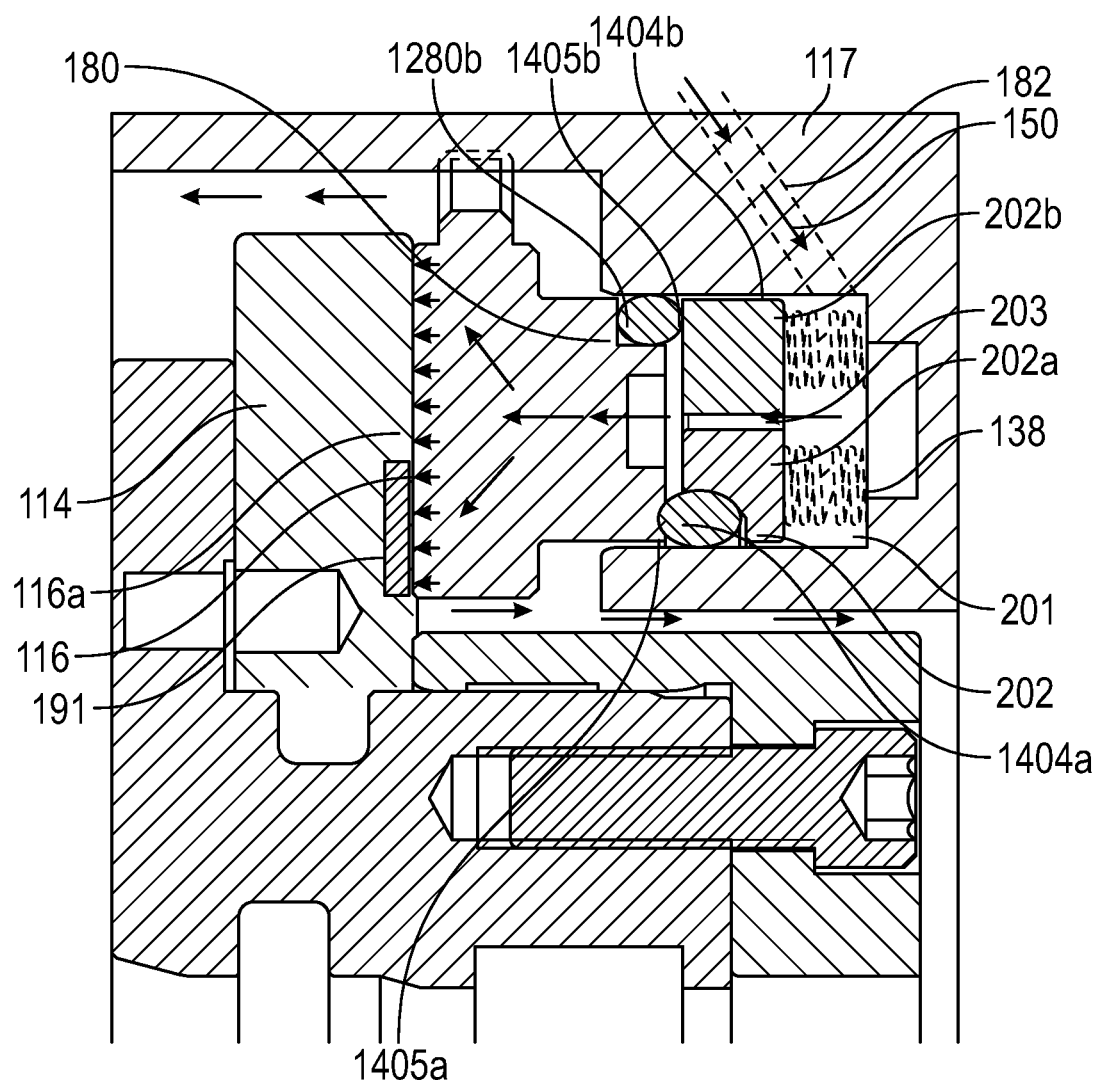

For sake of completeness, FIG. 14b shows the reverse situation of FIG. 14b. In particular, In more detail, the outer thrust ring 202b in FIG. 14b is substantially flat and has front face 1404b. The inner thrust ring 202a includes a receiving area 1404a to receive the inner o-ring 1405a. The front face 1402a of the inner thrust ring 202a in FIG. 14a is shown as being substantially planar. This variation will result in changes in the sealing planes and could be used with primary ring 116 that includes the groove 1280b shown in FIG. 14b or with any primary ring 116 shown herein (e.g., without or without grooves in it back).

Various embodiments of the invention have been described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Thus, any coupling or connection herein may later be called direct in the claims below even if not specifically recited in that manner above. Moreover, the various tasks and process steps described herein can be incorporated into a more comprehensive procedure or process having additional steps or functionality not described in detail herein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A separation seal for preventing fluid from entering a dry gas seal surrounding a shaft of a rotating machine, the separation seal comprising:
   a stator configured to be mounted around the shaft and configured to be fixedly attached to the rotating machine, the stator including a primary ring control chamber formed therein;
   a primary ring having a back;
   a first thrust ring at least partially within the primary ring control chamber and coupled to the primary ring;
   a mating ring coupled to the shaft that rotates with the shaft and relative to the primary ring; and
   one or more biasing members that urge the primary ring toward the mating ring to form a seal interface between the primary ring and the mating ring;
   wherein the stator includes a passageway constructed and arranged to convey pressurized buffer gas at a gas pressure in normal operation to the primary ring control chamber;
   wherein the primary ring is configured such that the pressurized buffer gas in the primary ring control chamber passes from the back of the primary ring, through the primary ring and to the seal interface;
   wherein buffer gas that reaches the seal interface passes, in normal operation, both radially inward and radially outward along the seal interface;
   wherein the mating ring includes grooves formed on a face thereof, wherein in the event of a buffer gas delivery pressure reduction, the grooves pump gas from an inner diameter of the seal interface to an outer diameter of the seal interface.

2. The separation seal of claim 1, further comprising:
   one or more sealing elements disposed between the first thrust ring and the back of the primary ring and within the primary ring control chamber, wherein the sealing elements are spaced apart from the back of the primary ring by a separating member.

3. The separation seal of claim 2, wherein the separating member is a ring.

4. The separation seal of claim 3, wherein the separating member is a second thrust ring.

5. The separation seal of claim 4, further comprising:
   one or more secondary sealing elements disposed between the second thrust ring and the back of the primary ring, wherein the one or more secondary sealing elements are not in the primary ring control chamber and do not contact a side of the primary ring control chamber.

6. The separation seal of claim 2, wherein the back of the primary ring includes one or move grooves formed therein to receive the one or more sealing elements.

7. The separation seal of claim 2, wherein the one or more sealing elements include a first sealing element and a second sealing element and wherein the first and second sealing elements are O-rings having different cross-sectional diameters.

8. An assembly for sealing a fluid in a rotating machine, the assembly comprising:
   a primary dry gas seal adapted and configured to surround a shaft of the rotating machine and prevent the fluid from exiting the rotating machine; and
   a secondary seal connected to the primary dry gas seal adapted and configured to prevent a liquid from entering the dry gas seal, the secondary seal comprising:
      a stator configured to be mounted around the shaft and configured to be fixedly attached to the rotating machine, the stator including a primary ring control chamber formed therein;
      a primary ring having a back;
      a split thrust ring at least partially within the primary ring control chamber and coupled to the primary ring, the split thrust ring including an inner ring and outer ring, wherein the inner ring is configured to move axially inboard relative to the outer ring in the event of an increase in the flow of the fluid through the primary dry gas seal;
      a mating ring coupled to the shaft that rotates with the shaft and relative to the primary ring;
      an outer ring biasing members that urges the outer ring and the primary ring toward the mating ring to form a seal interface between porous primary ring and the mating ring;
      an inner ring biasing member that urges the inner ring and the primary ring toward the mating ring; and
      one or more sealing elements disposed between the split thrust ring and the back of the primary ring and within the primary ring control chamber;
      wherein the stator includes a passageway constructed and arranged to convey pressurized buffer gas at a buffer gas pressure during normal operation to the primary ring control chamber;
      wherein the primary ring is configured such that gas in the primary ring control chamber passes from the back of the primary ring, through the primary ring and to the seal interface.

9. The assembly seal of claim 8, wherein buffer gas that reaches the seal interface passes, in normal operation, both radially inward and radially outward along the seal interface.

10. The assembly of claim 9, wherein a vent is provided that receives gas that passes through the primary dry gas seal and the buffer gas that travels radially inward along the seal interface.

11. The assembly of claim 10, wherein the stator defines a dry gas seal side passage way that allows buffer gas that passes radially inward to reach the vent during normal operation.

12. The assembly of claim 8, wherein the primary ring is formed of porous carbon.

13. The assembly of claim 12, wherein the sealing elements are spaced apart from the back of the primary ring by a separating member.

14. The assembly of claim 13, wherein the separating member is a ring.

15. The assembly of claim 8, wherein the back of the primary ring includes one or move grooves formed therein to receive the one or more sealing elements.

16. The assembly of 11, wherein the fluid is process gas and, in the event that the flow process gas through primary gas seal increases pressure in the vent above a threshold, the process gas that passes through the primary gas seal travels along the dry gas seal side passage to an inner diameter of the seal interface.

17. The assembly of claim 16, wherein the process gas at the inner diameter causes the inner ring to move axially with respect to the outer ring when the gas in the vent exceeds the threshold.

18. The assembly of claim 17, wherein the axial movement of the inner ring allows the process gas to enter the primary ring control chamber.

19. The assembly of claim 18, wherein the mating ring includes grooves formed on a face therein, wherein the grooves pump process gas from the inner diameter of the seal interface to an outer diameter of the seal interface.

* * * * *